(12) United States Patent
Lee et al.

(10) Patent No.: US 12,533,138 B2
(45) Date of Patent: Jan. 27, 2026

(54) OCCLUSIVE MATERIAL FOR MEDICAL DEVICE, SYSTEM, AND METHOD THEREOF

(71) Applicant: Coherex Medical, Inc., Salt Lake City, UT (US)

(72) Inventors: Sung K. Lee, West Jordan, UT (US); Annabel Lee, Salt Lake City, UT (US); Tom Ditter, Mission Viego, CA (US); William J. Z. Taylor, Redlands, CA (US); Robert S. Friedman, Los Angeles, CA (US)

(73) Assignee: Coherex Medical, Inc., Salt Lake City, UT (US)

( * ) Notice: Subject to any disclaimer, the term of this patent is extended or adjusted under 35 U.S.C. 154(b) by 0 days.

(21) Appl. No.: 17/716,073

(22) Filed: Apr. 8, 2022

(65) Prior Publication Data

US 2022/0330948 A1 Oct. 20, 2022

Related U.S. Application Data

(60) Provisional application No. 63/177,052, filed on Apr. 20, 2021.

(51) Int. Cl.
*A61B 17/12* (2006.01)
*A61B 17/00* (2006.01)

(52) U.S. Cl.
CPC .... *A61B 17/12122* (2013.01); *A61B 17/0057* (2013.01); *A61B 2017/00575* (2013.01); *A61B 17/12172* (2013.01)

(58) Field of Classification Search
CPC .......... A61B 17/12122; A61B 17/0057; A61B 17/12172; A61B 2017/00575; A61B 17/12181
See application file for complete search history.

(56) References Cited

U.S. PATENT DOCUMENTS

| | | | |
|---|---|---|---|
| 5,225,131 A | 7/1993 | Tamaru et al. | |
| 5,358,678 A | 10/1994 | Nakamura et al. | |
| 5,904,703 A * | 5/1999 | Gilson | A61B 17/0057 |
| | | | 606/213 |
| 6,434,976 B1 | 8/2002 | Yoshida et al. | |
| 8,636,764 B2 | 1/2014 | Miles et al. | |
| 9,943,315 B2 | 4/2018 | Kaplan et al. | |
| 10,464,116 B2 | 11/2019 | Nakazawa et al. | |
| 10,722,240 B1 | 7/2020 | Melanson et al. | |

(Continued)

FOREIGN PATENT DOCUMENTS

EP 0899242 3/1999

*Primary Examiner* — Darwin P Erezo
*Assistant Examiner* — Raihan R Khandker
(74) *Attorney, Agent, or Firm* — David L. Stott

(57) ABSTRACT

Medical devices, systems and methods for forming an occlusive material for occluding a left atrial appendage of a heart are provided. In one embodiment, the occlusive material includes a foam portion that extends as a single piece, seamless monolithic structure that is sized to couple to an external side of a framework of a medical device. In another embodiment, the occlusive material may include a polymeric laminate. Such polymeric laminate may be adhered to an outer side of the foam portion. Further, various embodiments for forming a polymer laminate are provided.

20 Claims, 15 Drawing Sheets

(56) References Cited

U.S. PATENT DOCUMENTS

| | | | |
|---|---|---|---|
| 2007/0066993 A1* | 3/2007 | Kreidler | A61B 17/12122 606/213 |
| 2009/0254172 A1* | 10/2009 | Grewe | A61F 2/856 623/1.15 |
| 2016/0278784 A1* | 9/2016 | Edmiston | A61B 17/12177 |
| 2016/0331380 A1* | 11/2016 | Venkatraman | A61B 17/1219 |
| 2018/0116678 A1 | 5/2018 | Melanson et al. | |
| 2020/0230298 A1 | 7/2020 | Maitland et al. | |

* cited by examiner

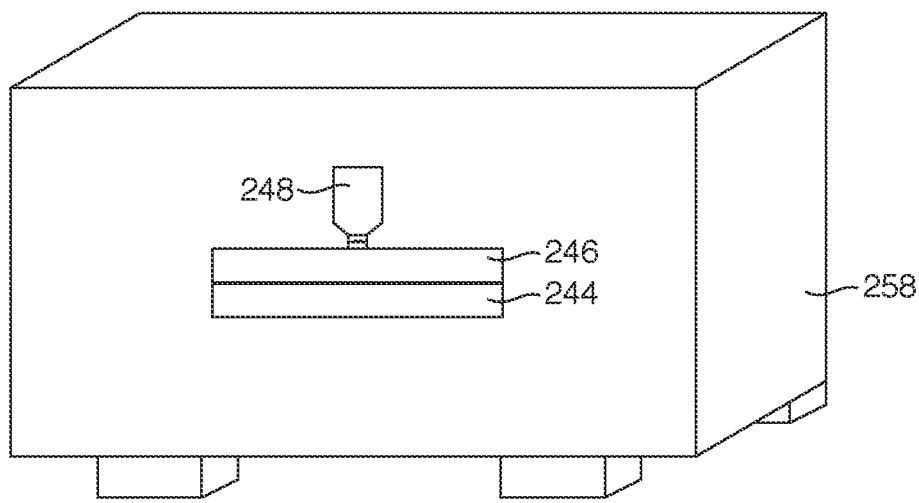
FIG. 22
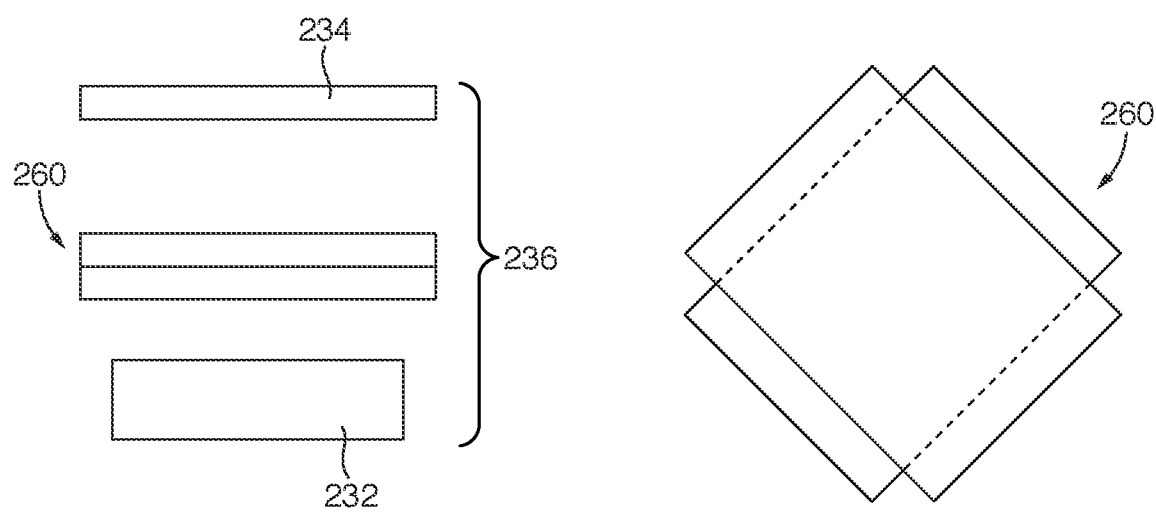
FIG. 23
FIG. 24

OCCLUSIVE MATERIAL FOR MEDICAL DEVICE, SYSTEM, AND METHOD THEREOF

CROSS-REFERENCE TO RELATED APPLICATIONS

This application claims the benefit of U.S. provisional application No. 63/177,052, filed Apr. 20, 2021, the disclosure of which is hereby incorporated by reference herein in its entirety.

TECHNICAL FIELD

The present invention relates generally to the occlusion of tissue openings or appendages and, more specifically, to structural characteristics of occlusive material for devices, systems and methods for occluding or otherwise structurally altering such openings and appendages including, for example, left atrial appendages.

BACKGROUND

The upper chambers of the heart, the atria, have appendages attached to each of them. For example, the left atrial appendage is a feature of all human hearts. The physiologic function of such appendages is not completely understood, but they do act as a filling reservoir during the normal pumping of the heart. The appendages typically protrude from the atria and cover an external portion of the atria. Atrial appendages differ substantially from one to another. For example, one atrial appendage may be configured as a tapered protrusion while another atrial appendage may be configured as a re-entrant, sock-like hole. The inner surface of an appendage is conventionally trabeculated with cords of muscular cardiac tissue traversing its surface with one or multiple lobes.

The atrial appendages appear to be inert while blood is being pumped through them during normal heart function. In other words, the appendages do not appear to have a noticeable effect on blood pumped through them during normal heart function. However, in cases of atrial fibrillation, when the atria go into arrhythmia, blood may pool and thrombose inside of the appendages. Among other things, this can pose a stroke risk when it occurs in the left appendage since the thrombus may be pumped out of the heart and into the cranial circulation once normal sinus rhythm is restored following arrhythmia events.

Historically, appendages have sometimes been modified surgically to reduce the risk imposed by atrial fibrillation. In recent years devices which may be delivered percutaneously into the left atrial appendage have been introduced. The basic function of these devices is to exclude the volume within the appendage with an implant which then allows blood within the appendage to safely thrombose and then to be gradually incorporated into cardiac tissue. This process, coupled with the growth of endothelium over the face of the device, can leave a smooth, endothelialized surface where the appendage is located. In comparison to surgical procedures, devices implanted percutaneously are a less invasive means for addressing the problems associated with the left atrial appendage.

However, due to the wide variability of the ostium size and volume of the left atrial appendage, most current implantable devices include structure that cannot meet such variability, resulting in inadequate devices for many left atrial appendage anatomies. Further, such implantable devices are typically limited in their functionality as being able to be adjusted in the left atrial appendage after being anchored thereto. Further, another potential problem with many current occluder type devices involves the variability in the occlusive material attached to its framework, such as the unintended variability in the thickness of the occlusive material. For example, occlusive material for occluder type devices is often formed from sheet material. The manual processes involved for forming a three-dimensional shape from the sheet material and effectively attaching the sheet material to the framework is tedious, results in inconsistencies due to its manual and intricate process, and typically requires overlapping the sheet material in order to effectively maintain its subsequently formed three-dimensional shape.

Another problem with the occlusive material of some occluder type devices relates to the process of forming an expanded polytetrafluoroethylene ("ePTFE") laminate. Such formation of an ePTFE laminate typically requires stacking multiple layers of ePTFE film, which stacked layers undergo being placed under a compressive force and a heat process to form the ePTFE laminate. However, often its desired to have varying thicknesses along a given length of the ePTFE laminate such that the layers of ePTFE film require forming somewhat complex structures with varying thicknesses to arrive at the desired ePTFE laminate. When applying the compressive force on the stacked layers of ePTFE film, the varying thicknesses in the stacked layers can result in some portions of the ePTFE layers not receiving the same compressive force or pressure as other portions of the ePTFE layers, as well as inconsistent temperatures applied across the surface of the stacked ePTFE layers. Such variation can result in inconsistencies in the structural characteristics and ultimate performance of the formed ePTFE laminate.

As such, it would be advantageous to provide more consistent characteristics in the occlusive material. Such consistent characteristics will only enhance the ability for physicians to more consistently occlude openings that exhibit wide anatomical variability, as set forth above, as well as provide increased effectiveness in the occlusive material itself.

A variety of features and advantages will be apparent to those of ordinary skill in the art upon reading the description of various embodiments set forth below.

BRIEF SUMMARY OF THE INVENTION

Embodiments of the present invention are directed to various devices, systems and methods of forming an occlusive material employed for occluding a tissue opening. In one embodiment, a medical device for occluding a left atrial appendage of a heart is provided. The medical device includes a framework and an occluder member. The framework includes occluder frame segments coupled to a hub defining an axis, the occluder frame segments of the framework extending radially outward and distally from the hub relative to the axis. The occluder member includes a foam portion, the foam portion having a single piece, seamless monolithic structure with a cup-like shape defining an internal side foam surface and an external side foam surface extending between a proximal foam end and a distal foam end. The foam portion is sized and configured to correspond with an external surface of the framework such that the foam portion is positionable against an external surface of the occluder frame segments of the framework such that the proximal foam end is positionable adjacent the hub and the distal foam end is positionable adjacent a distal end of the occluder frame segments.

In another embodiment, the foam portion extends to define an opening therein such that the proximal foam end defines the opening of the foam portion. In another embodiment, the foam portion extends with a substantially consistent thickness. In still another embodiment, the foam portion is configured to be stitched to portions of the framework.

In another embodiment, the occluder member includes a polymeric material adhesively attached to the external surface of the foam portion. In another embodiment, the foam portion includes a biodegradable material extending with a scaffold structure, the scaffold structure sized and configured to induce tissue in-growth therein. In yet another embodiment, the framework includes anchor frame segments extending between first and second ends, the first end pivotably coupled to the occluder frame segments and the second end coupled to a secondary hub, the secondary hub moveable relative to the hub and along the axis.

In accordance with another embodiment of the present invention, a method of forming a polymeric laminate is provided. In one embodiment, the method includes the steps of: positioning polymer films over each other to form a stacked polymer film structure, the stacked polymer film structure defining a top surface; applying pressure to the top surface of the stacked polymer film structure with separate upper mold structures such that each of the upper mold structures is configured to be independently loaded; and elevating a temperature of the stacked polymer film structure.

In another embodiment, the positioning step includes stacking the polymer films so that the top surface extends with a stepped profile. In another embodiment, the applying step includes applying pressure with mold structures slidingly interconnected to each other. In yet another embodiment, the applying step includes applying pressure to the stacked polymer film structure with the separate upper mold structures to provide substantially consistent pressure to the top surface of the stacked polymer film structure. In still another embodiment, the applying step includes applying pressure to the top surface of the stacked polymer film structure such that the top surface extends with a stepped profile.

In accordance with another embodiment of the present invention, a method of forming a polymeric laminate is provided. In one embodiment, the method includes the steps of: positioning polymer films over each other to form a stacked polymer film structure, the stacked polymer film structure; positioning a flexible metallic foil over the stacked polymer film structure; applying isostatic pressure to an upper surface of the flexible metallic foil; and elevating a temperature of the stacked polymer film structure.

In another embodiment, the positioning polymer films step includes positioning the polymer films so that a top surface of the stacked polymer film structure defines a stepped profile. In still another embodiment, the positioning polymer films step includes positioning the polymer films to that a top surface of the stacked polymer film structure extends with a flat structure. In another embodiment, the positioning polymer films step includes positioning the polymer films over a base member.

In another embodiment, the method further includes the step of sealing the stacked polymer film structure between upper and lower plates. In another embodiment, the method further includes the step of positioning the stacked polymer film structure between upper and lower plates so that the stacked polymer film structure is placeable under isostatic pressure with the flexible metallic foil thereon. In another embodiment, the applying step includes supplying pressurized gas between upper and lower plates with the stacked polymer film structure therebetween from a gas pressurization system. In still another embodiment, subsequent to the elevating step, the method further includes allowing the stacked polymer film structure to cure to for forming the polymeric laminate. In another embodiment, subsequent to the elevating step, the method further includes removing the flexible metallic foil from the stacked polymer film to expose the polymeric laminate.

BRIEF DESCRIPTION OF THE SEVERAL VIEWS OF THE DRAWINGS

The foregoing and other advantages of the invention will become apparent upon reading the following detailed description and upon reference to the drawings in which:

FIG. 22 is a schematic view of the pressurization assembly positioned within a furnace, according to another embodiment of the present invention;

FIG. 23 is a schematic view of the stack assembly, depicting the polymeric laminate formed and separated from other components of the stack assembly, according to another embodiment of the present invention; and FIG. 24 is a top view of the polymeric laminate, according to another embodiment of the present invention.

DETAILED DESCRIPTION OF THE INVENTION

Figure 1:
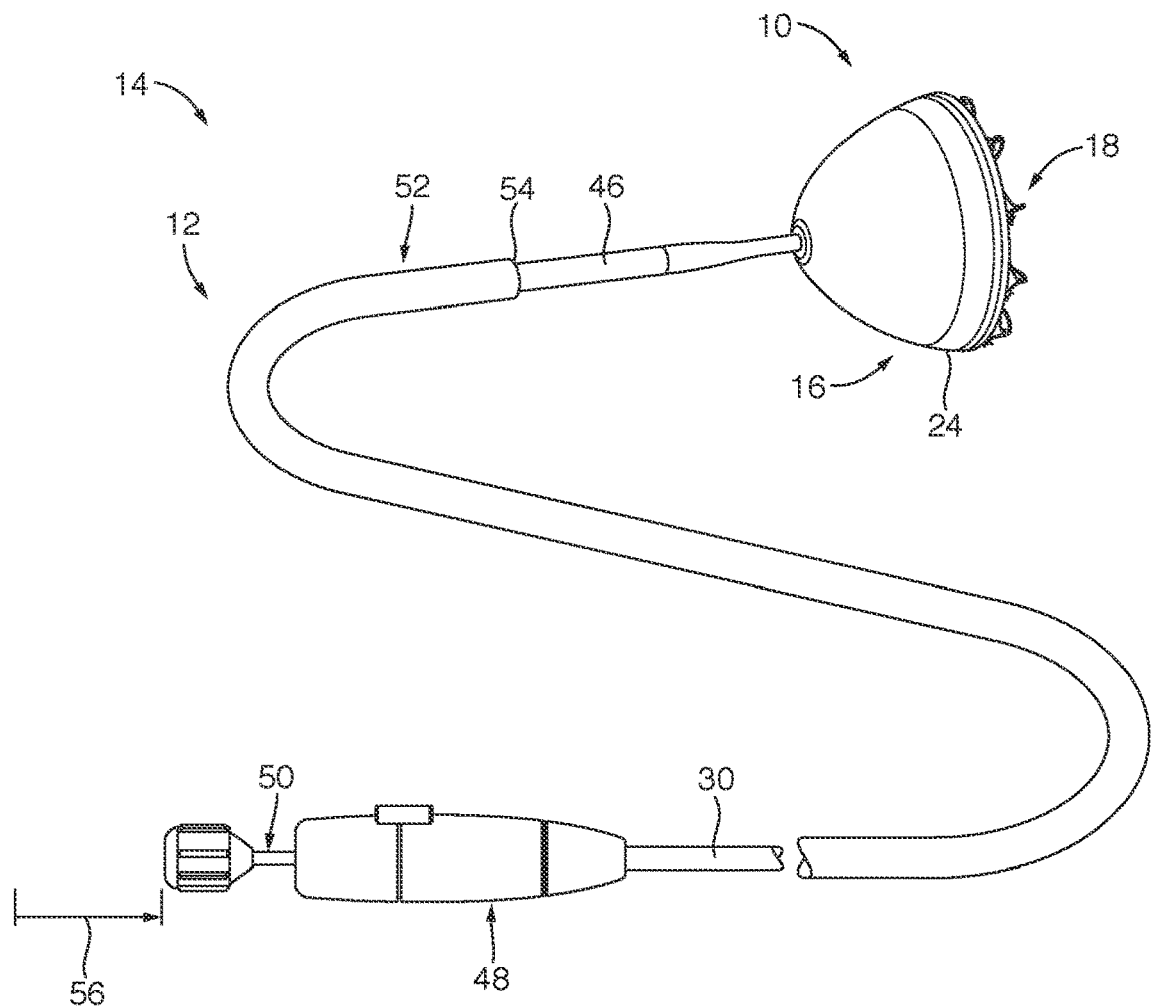
FIG. 1 is a perspective rear view of a medical device system, depicting a medical device coupled to a delivery system, according to one embodiment of the present invention.
Figure 4:
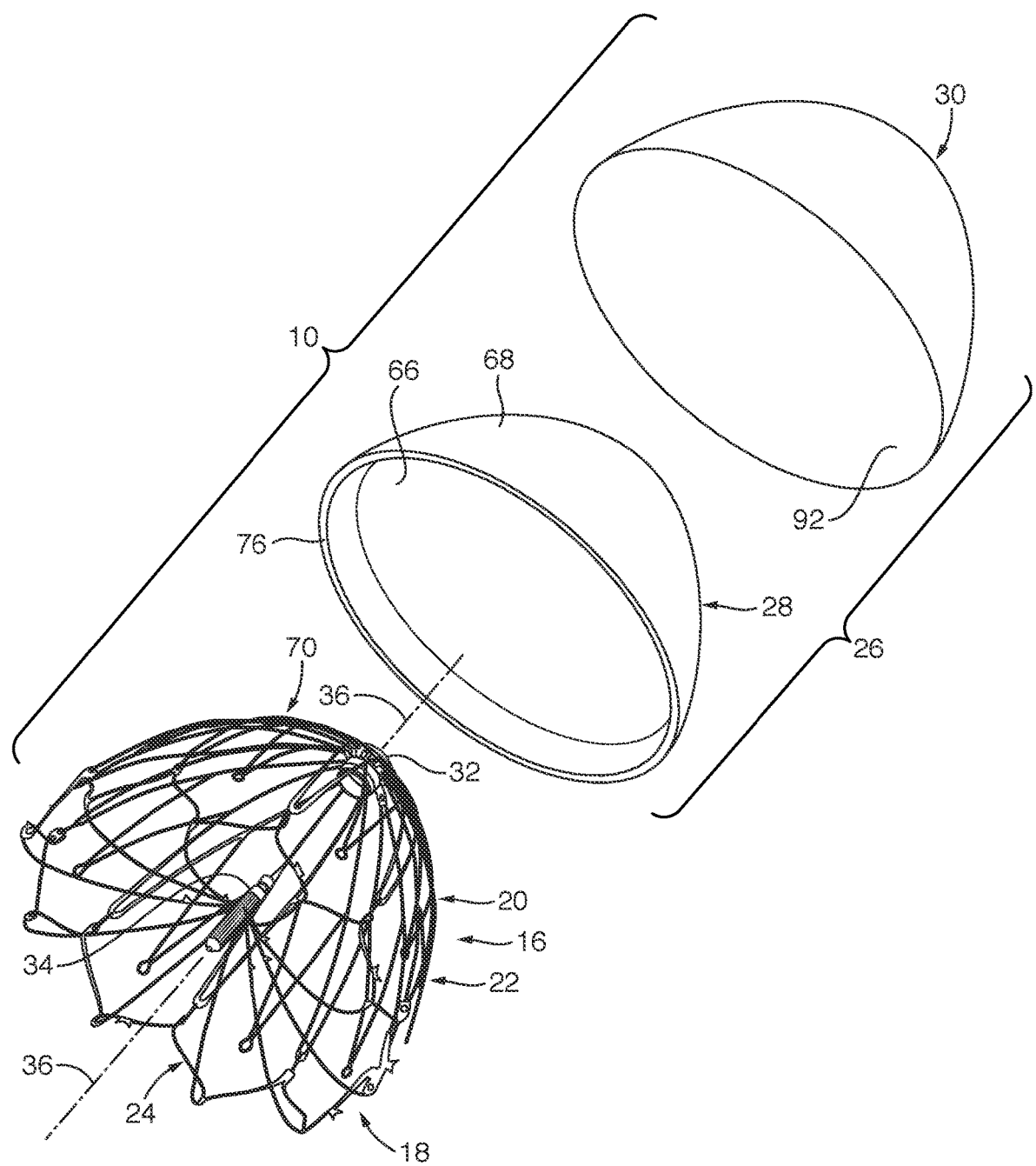
FIG. 4 is an exploded view of some of the components of the medical device, depicting a frame, a foam portion, and a laminate portion, according to another embodiment of the present invention.
Figure 5:
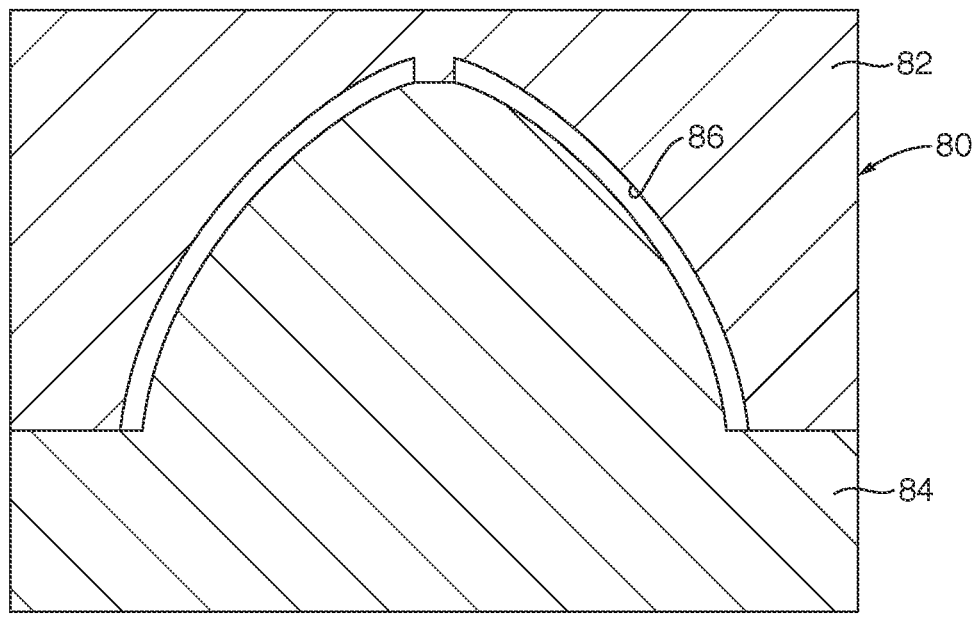
FIG. 5 is a cross-sectional schematic view of mold components for forming the foam portion of the medical device of FIG. 4, according to another embodiment of the present invention.

Referring to FIGS. 1 and 4, a medical device 10 removably coupled to a delivery system 12 is provided. The medical device 10 and delivery system 12 together may be referenced as a medical device delivery system 14, which may be employed in interventional procedures for percutaneously closing and modifying an opening or cavity such as, for example, a left atrial appendage within a heart (not shown). The medical device 10 may extend to define an occluder portion 16 and an anchor portion 18. The occluder portion 16 and the anchor portion 18 may define a frame structure 20 that defines corresponding frame components of an occluder frame 22 and an anchor frame 24. The occluder portion 16 may include the occluder frame 22 with a tissue growth member 26 or an occlusive material attached to the occluder frame 22. The occlusive material of the tissue growth member 26 may be sized and configured to enhance and promote tissue in-growth within and along the material of the occlusive material. Further, the tissue growth member 26 may be formed from one or more polymeric materials, such as a foam material 28 and a polymeric laminate 30. The foam material 28, also referenced herein as a foam portion, may be polyurethane foam or a silicon foam, or any other suitable foam material, reticulated or non-reticulated. The polymeric laminate 30, also referenced herein as a laminate portion, may be formed with a pressurized thermal bonding process of multiple layers of ePTFE ("expanded polytetrafluoroethylene") such that the multiple layers of ePTFE may extend to define various thicknesses along a given length of the laminate. Such foam material 28 and polymeric laminate 30 will be further described hereafter, according to the present invention.

Figure 9:
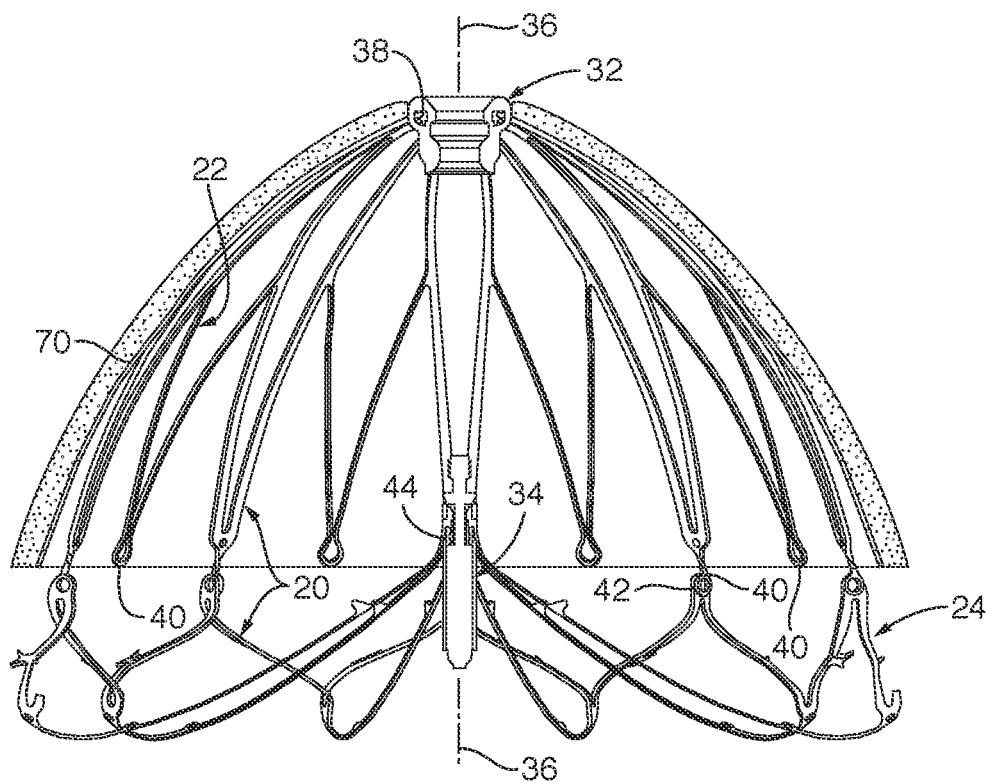
FIG. 9 is a cross-sectional view of the medical device, depicting the foam portion with an ePTFE laminate adhered therewith positioned over the frame of the medical device, according to another embodiment of the present invention.

With reference to FIGS. 4 and 9, as set forth, the frame structure 20, also referenced herein as a framework, extends to define the occluder frame 22 and the anchor frame 24. The occluder frame 22 may be directly coupled to a primary hub 32 and the anchor frame 24 may be directly coupled to a secondary hub 34 or anchor hub. The primary hub 32 and the secondary hub 34 may be axially aligned such that the primary hub 32 and the secondary hub 34 define an axis 36. The occluder frame 22 may extend with occluder frame segments between a proximal end 38 and a distal end 40 thereof. The occluder frame 22 may be coupled to the primary hub 32, at the proximal end 38 of the occluder frame 22, such that the occluder frame 22 extends radially outward relative to the axis 36 and distally from the primary hub 32 to the distal end 40 of the occluder frame 22. The anchor frame 24 may extend between a first end 42 and a second end 44, the first end 42 of the anchor frame 24 being pivotably coupled to the distal end 40 of the occluder frame 22 and the second end 44 of the anchor frame 24 being coupled to the secondary hub 34. With this arrangement, the anchor frame 24 is moveable or pivotable between a deployed position (FIG. 1) and a retracted position (FIG. 2) by moving the secondary hub 34 along the axis 36 distally and proximally, respectively, to assist the physician in adjusting the position of the medical device 10 subsequent to the anchor portion 18 being secured to tissue in the left atrial appendage. Such pivotable coupling between the anchor frame 24 and occluder frame 22 may be employed with multiple hinge/eyelet arrangements between the first end 42 of the anchor frame 24 and the distal end 40 of the occluder frame 22.

Figure 2:
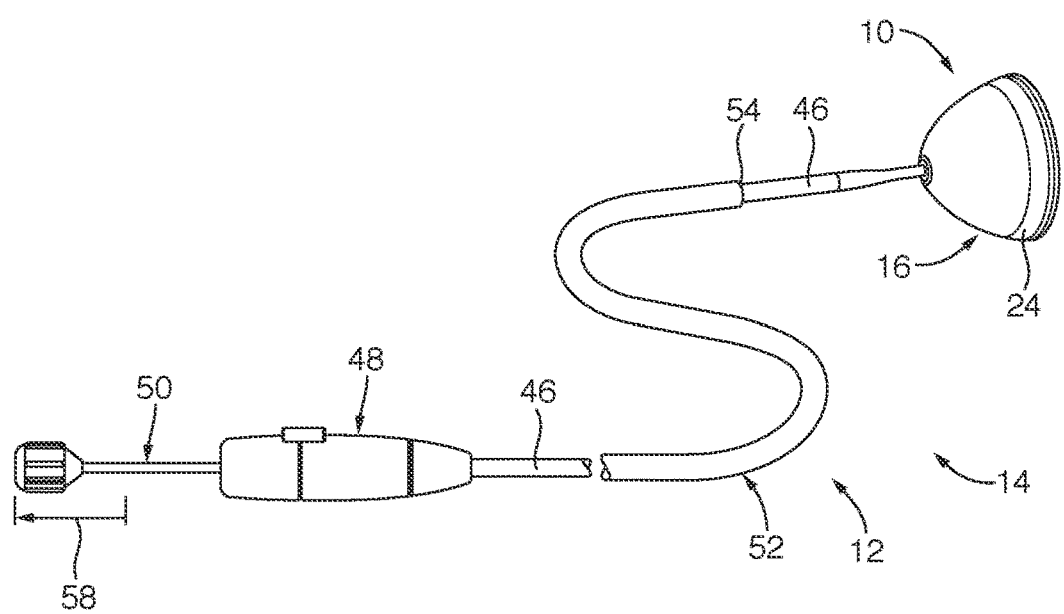
FIG. 2 is a perspective rear view of a medical device system, depicting an anchor portion of the medical device retracted with an anchor actuator of a handle of the delivery system, according to another embodiment of the present invention.
Figure 3:
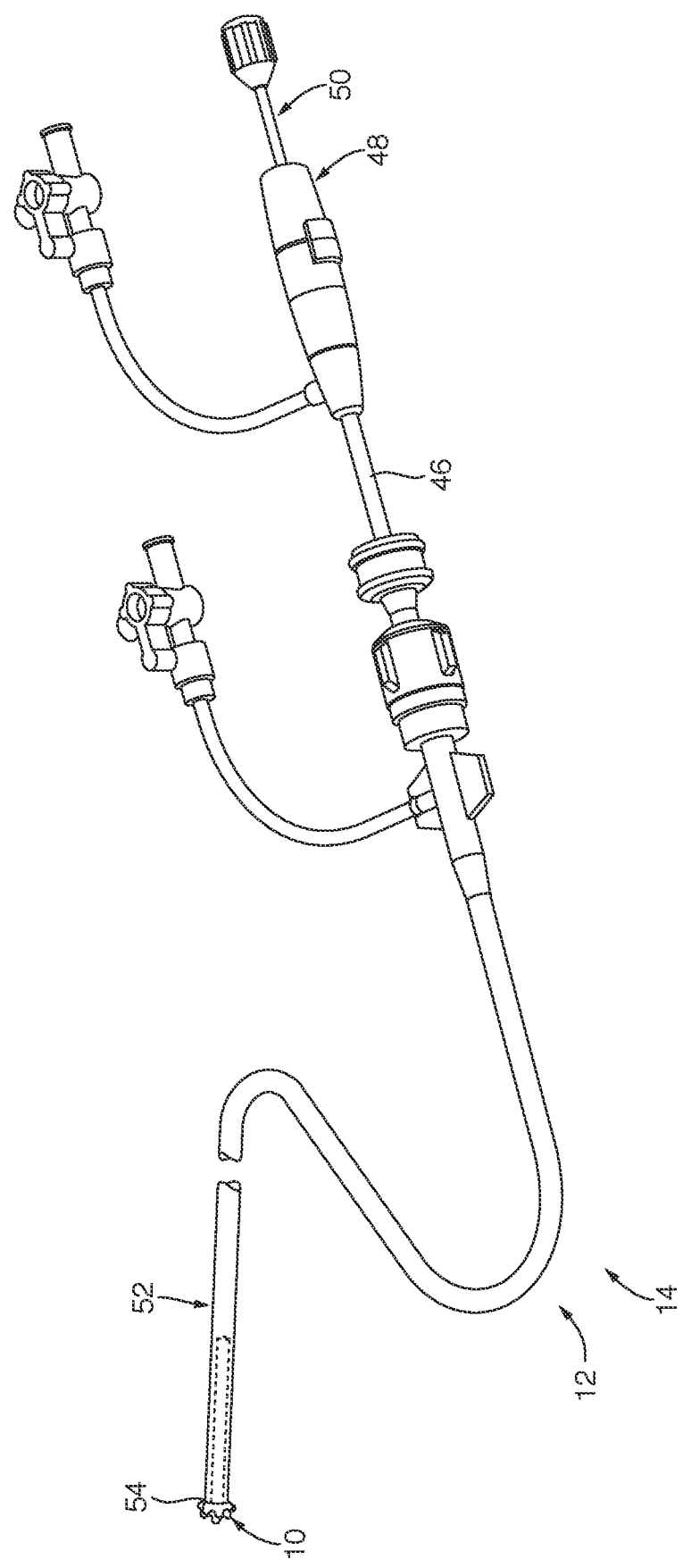
FIG. 3 is a perspective view of the medical device system, depicting the medical device at least partially constricted within a sheath of the medical device system, according to another embodiment of the present invention.

With reference to FIGS. 1-4, as set forth, the medical device 10 may be delivered through the vasculature with the delivery system 12. The delivery system 12 may include a pusher catheter 46 and a handle 48, the handle 48 integrated with a proximal portion of the catheter 46. The handle 48 may include various functional components, such as an anchor actuator 50, to manipulate and move the secondary hub 34 along the axis 36 so that the anchor frame 24 may be pivoted between the deployed position (FIG. 1) and the retracted position (FIG. 2). The delivery system 12 may include and be employed with a delivery sheath 52 for delivering the medical device 10 to the left atrial appendage. The delivery sheath 52 may be positioned within the vasculature using known interventional techniques with a sheath distal end 54 deliverable to be positioned adjacent the left atrial appendage of the heart. Upon the medical device 10 being advanced through a lumen of the delivery sheath 52 to the sheath distal end 54 (the medical device 10 being in the constricted position partially shown in dashed lines adjacent the sheath distal end 54 (see FIG. 3)), the medical device 10 may at least partially be deployed from the delivery sheath 52. That is, the delivery sheath 52 may then be manually moved proximally (and/or the pusher catheter 46 advanced distally) so that the occluder portion 16 of medical device 10 may be deployed from the sheath distal end 54. Such occluder portion 16 may immediately self-expand as the occluder portion 16 is exposed from the sheath distal end 54. At this stage, the medical device 10 may be in a partially deployed state, after which, the medical device 10 may be moved to a fully deployed state by deploying the anchor portion 18. For example, upon the occluder portion 16 initially being deployed, the anchor portion 18 may be in the retracted position with the anchor actuator 50 of the handle 48 in the proximal position (as depicted in FIG. 2). Once a physician determines that the occluder portion 16 is in an appropriate and desired position adjacent the left atrial appendage, the anchor portion 18 may be pivoted from the retracted position to the deployed position by moving the anchor actuator 50 to the distal position, as shown by arrow 56 (see FIG. 1). Once the anchor portion 18 is moved to the deployed position, the tines 58 (FIG. 4) of the anchor portion 18 may engage tissue to secure the medical device 10 in the left atrial appendage. If the physician determines that the medical device 10 is not in an optimal secured position in the left atrial appendage, the anchor portion 18 may be pivoted back to the retracted position by moving the anchor actuator 50 from the distal position to the proximal position, as shown by arrow 60 (see FIG. 2). As such, the anchor actuator 50 may be manually moved proximally and distally to move the anchor portion 18 between the retracted and deployed positions such that the anchor portion 18 pivots between the deployed and retraced positions. In this manner, the anchor portion 18 of the medical device 10 may be secured and disengaged from tissue in the left atrial appendage as needed by the physician until the physician obtains an optimal position or is satisfied with its position prior to releasing the delivery system 12 from the medical device 10. A similar medical device delivery system is disclosed in commonly assigned U.S. patent application Ser. No. 15/438,650, filed on Feb. 21, 2017, now issued as U.S. Pat. No. 10,631,969 entitled MEDICAL DEVICE FOR MODIFICATION OF LEFT ATRIAL APPENDAGE AND RELATED SYSTEMS AND METHODS, the disclosure of which is incorporated by reference herein in its entirety.

Now with reference to FIG. 4, components of the medical device 10 are shown in exploded form, namely, the framework 20 of the medical device 10, the foam portion 28 and a laminate portion 30. The foam portion 28 and/or the laminate portion 30 may also be referenced herein as the tissue growth member 26. The foam portion 28 may be positioned between the framework 20 and the laminate portion 30 such that the laminate portion may be positioned and fixated to and over an outer side of the foam portion 28. Similarly, the foam portion 28 may be positioned and attached to an outer side of the framework 20.

Figure 8:
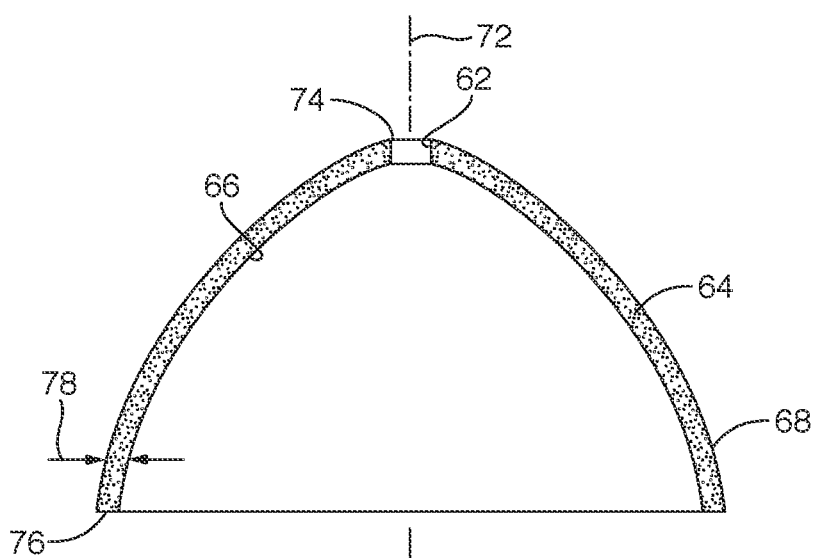
FIG. 8 is a cross-sectional schematic view of the foam portion, according to another embodiment of the present invention.

With reference to FIGS. 4 and 8, the foam portion 28 may extend with a cup shape with a proximal opening 62 defined in the foam portion 28, the foam portion 28 extending with a wall 64 to define an inner surface 66 and an outer surface 68 of the wall 64. In one embodiment, the outer surface 68 may be covered by the laminate portion 30. Further, the inner surface 66 of the foam portion 28 may be sized and configured to be positioned against an external side 70 or proximal side of the occluder frame 22 so that the foam portion 28 may be attached to the occluder frame 22. The foam portion 28 may extend as a single piece, seamless and monolithic structure. In other words, the foam portion 28 is not formed from sheet material and then manipulated to form a three-dimensional shape. Rather, the foam portion 28 may be originally formed as a three-dimensional shape in the single piece, seamless and monolithic structure so as to extend with a generally cup shaped structure. With such cup shaped structure, the foam portion 28 may define a foam portion axis 72 such that the wall 64 may extend radially outward and distally from a foam proximal end 74 to a foam distal end 76 of the wall 64. The foam proximal end 74 may define the proximal opening 62 defined in the foam portion 28. Such proximal opening 62 defined in the foam portion 28 may be sized and configured to fit around and correspond with the primary hub 32 of the framework 20. Further, the wall 64 may extend with a wall thickness 78. The wall thickness 78 may be substantially uniform between the proximal and distal ends 74, 76 of the wall 64. In another embodiment, along pre-determined portions of the wall 64, the wall 64 may be thicker than other portions of the wall 64. The foam portion 28 may be formed with the single piece, seamless and monolithic structure by employing casting or molding techniques or even three-dimensional printing, or any other suitable technique, such as embossing techniques, for originally forming the foam portion into a three-dimensional cup-like shape that is one piece, seamless, and a monolithic structure.

Now with reference to FIGS. 5-8, one embodiment of a method for forming the foam portion 28 as a three-dimensional cup-shaped structure that is formed initially as a single piece, seamless, monolithic structure will now be described. For example, with respect to FIGS. 5 and 6, the foam material 28 may be formed in a mold 80, the mold 80 having a first mold member 82 and a second mold member 84. The first and second mold members 82, 84 extending to define a gap 86 between the first and second mold members 82, 84 and within the mold 80. The gap 86 may be sized to correspond with the foam portion 28, as previously described. Further, the mold 80 may define an input channel (not shown). The input channel may be sized and configured to facilitate filling the gap 86 with a liquid foam material that may be heated, for example. Upon filling the gap 86 with the pre-foam material in liquid form, the pre-foam material may cure over a pre-determined period of time to then solidify, as known to one of ordinary skill in the art.

Figure 6:
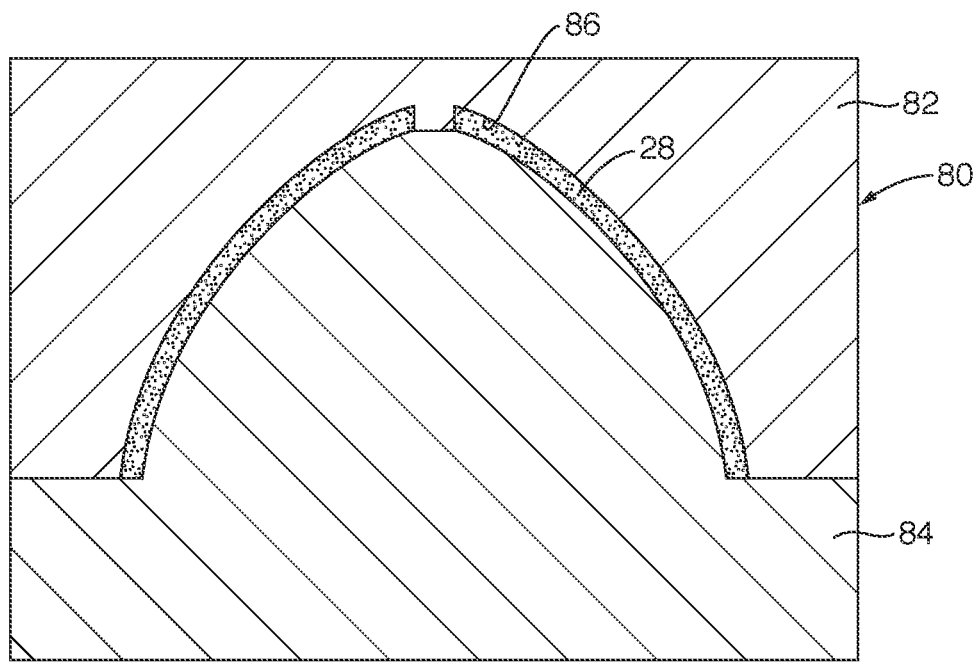
FIG. 6 is a cross-sectional schematic view of the mold components, depicting the foam portion formed within the mold components, according to another embodiment of the present invention.
Figure 7:
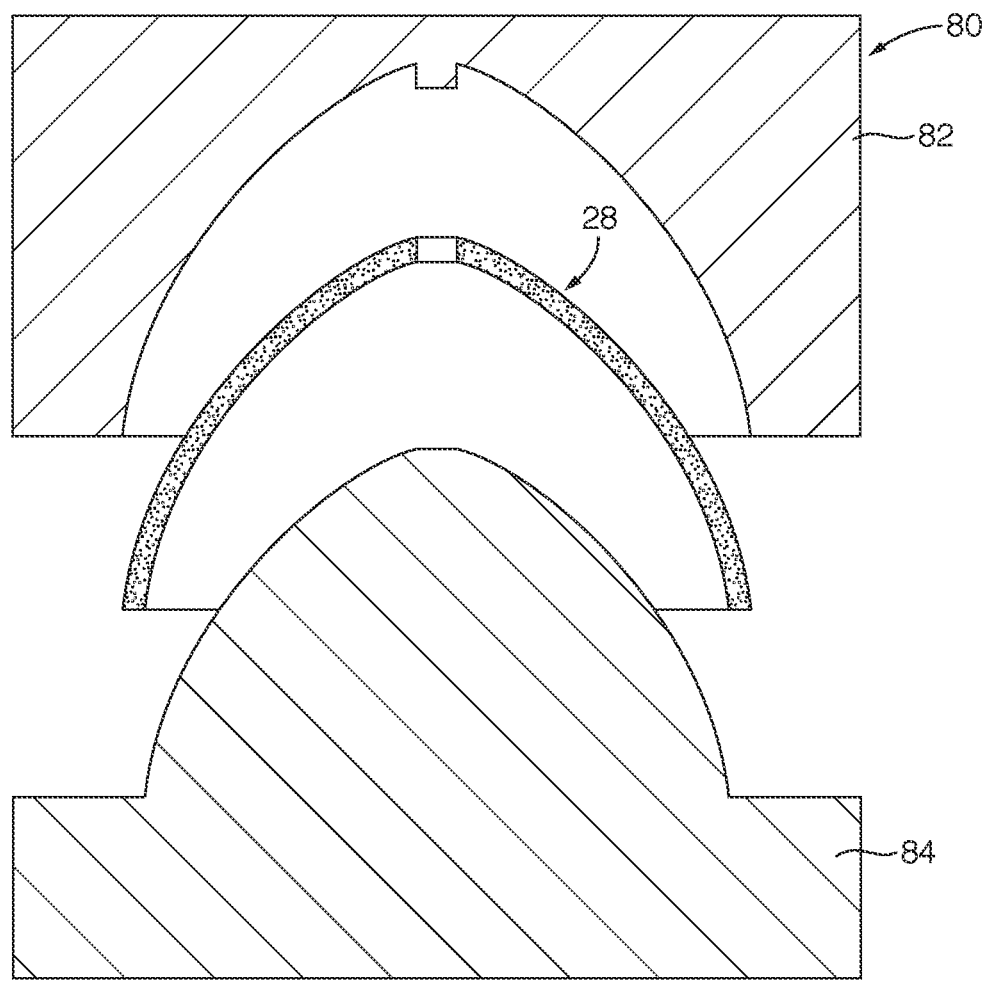
FIG. 7 is a cross-sectional schematic view of the mold components, depicting the mold components and the foam portion separated from each other, according to another embodiment of the present invention.

With reference to FIGS. 6, 7 and 8, upon the foam material 28 being cured, the first and second mold members 82, 84 may be separated to expose the foam portion 28 such that the foam portion may be removed from the first and second mold members 82, 84. In this manner, the foam portion 28 may be formed initially as a three-dimensional cup shaped structure that may be the before described single piece, seamless and monolithic structure. Such foam portion 28 may extend with an intended and known thickness 78 along the wall 64 of the foam portion 28. As such, the foam portion 28, formed initially as the three-dimensional cup shape by molding or casting as described above, for example, may provide a more consistently formed foam portion 28 relative to the thickness 78 of the foam portion 28 (and the intended foam dimensions corresponding with the framework 20 (FIG. 4) of the medical device 10), as well as eliminating over-lapping of sheet material and eliminating unintended gaps or holes in the foam portion 28 by not having to form the foam portion from sheet material.

As previously set forth, the foam portion 28 may be a polyurethane foam or a silicon foam, or any other suitable foam material, reticulated or non-reticulated. Further, the foam portion 28 may act as a scaffold and may be formed from a material that is biodegradable or bioresorbable, as known in the art. Such scaffold type biodegradable or bioresorbable material may promote tissue ingrowth therein such that, over a period of time, the tissue ingrowth may replace the scaffold structure. In other words, the scaffold structure may be absorbed into the tissue after the tissue grows into and through the scaffold structure. In another embodiment, the foam portion 28 may be formed as the single piece, seamless and monolithic structure such that pores in the foam material may be formed with pre-determined sizes. For example, the pores in the foam portion 28 may be sized within the range of 30 microns to 500 microns to promote or prohibit cell growth within the foam portion. In another embodiment, the pores in the foam portion 28 may gradually increase in size through the thickness to create a varied environment for cell growth. In another embodiment, the foam portion 28 may be treated with a hydrophilic coating or exhibit other embedded materials to increase the visibility under echocardiographic imaging. In another embodiment, the foam portion 28 may be a stand-alone barrier with or without pore size variation through the thickness of the foam portion 28. In some embodiments, the foam portion 28 may include large cut-outs (not shown) for volume reduction to facilitate reducing implant friction within the lumen of the delivery sheath 52 during delivery of the medical device 10 through the delivery sheath 52 (see FIG. 3). In this manner, forming the foam initially as a single piece, seamless and monolithic structure may facilitate forming the foam portion with better predetermined and consistent structural characteristics.

Figure 10:
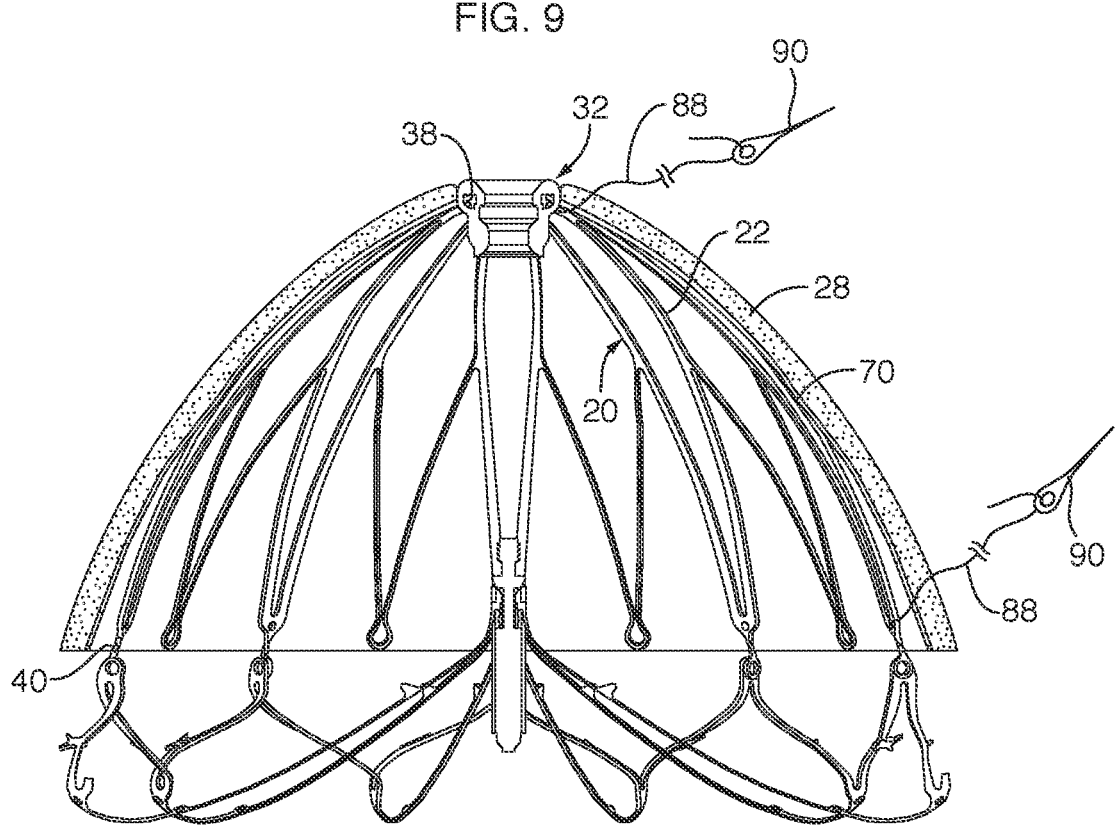
FIG. 10 is a cross-sectional view of the medical device, depicting stitching of the foam portion to the frame, according to another embodiment of the present invention.

Now with reference to FIGS. 9 and 10, the foam portion 28 may be attached to the framework 20 of the medical device 10. In one embodiment, the foam portion 28 may be positioned over the framework such that the proximal end 74 (FIG. 8) of the foam portion 28 may be tucked between struts of the framework 20 and a portion of the primary hub 32 of the framework 20. Further, the foam portion 28 may substantially extend over the external side 70 or external surface of the occluder frame 22 of the framework 20 and at least partially leave the anchor frame 24 of the framework 20 exposed or uncovered. Upon the foam portion 28 being appropriately positioned on the external side 70 of the occluder frame 22, the foam portion 28 may be secured or attached to the occluder frame 22 of the framework 20 via a stitching process. For example, the stitching process may include employing a filament 88 and a needle 90 for stitching the foam portion 28 to the occluder frame 22 such that the foam portion 28 may be stitched to distal and proximal portions of the occluder frame 22, as depicted in FIG. 9. Such filament 88 may be suture or medical grade thread or the like such that the foam portion 28 may be attached to the framework 20 manually or with any other suitable automated process, as known in the art. With this arrangement, the foam portion 28 may cover the external surface 70 of the occluder frame 22 between the proximal and distal ends 38, 40 of the occluder frame 22.

Figure 11:
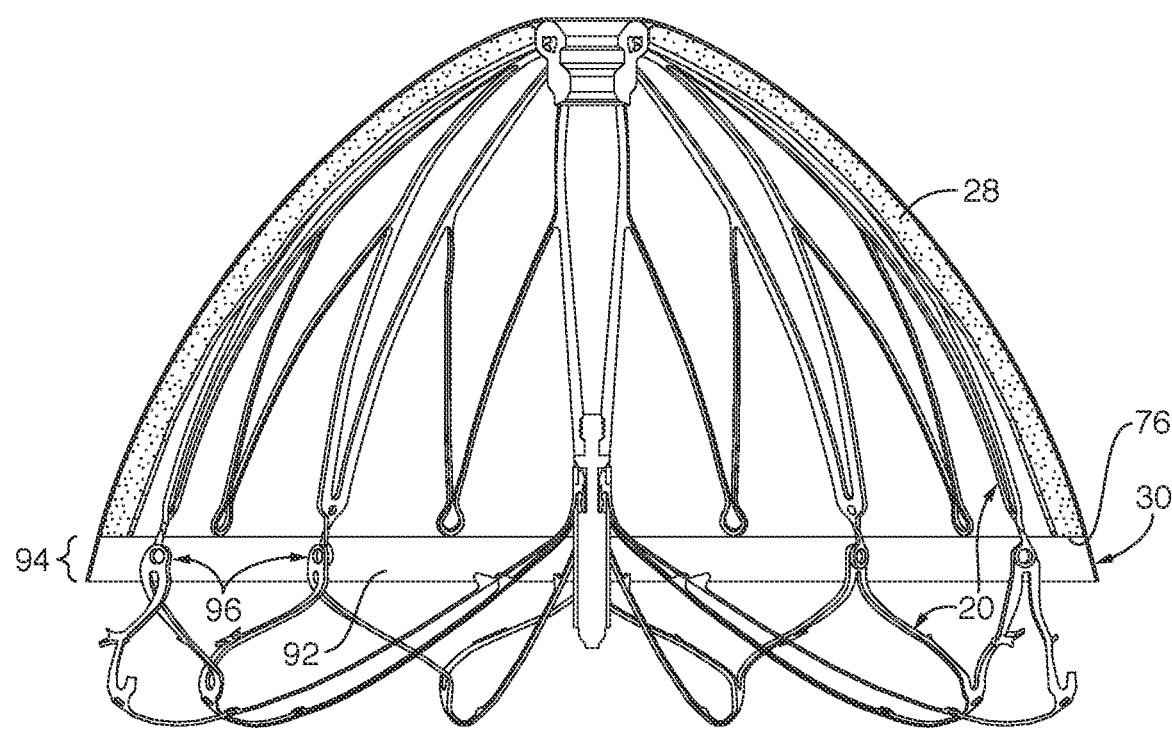
FIG. 11 is a cross-sectional side view of the medical device, depicting a polymeric laminate positioned over the foam portion of the medical device, according to another embodiment of the present invention.
Figure 12:
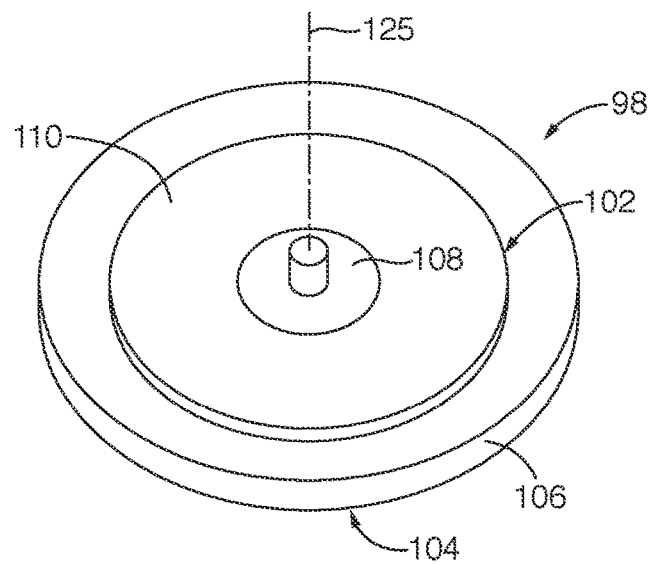
FIG. 12 is a perspective view of a mold assembly for forming a polymeric laminate, according to another embodiment of the present invention.

Now with reference to FIGS. 4 and 11, once the foam portion 28 has been attached to the framework 20 via, for example, the previously described stitching process, the foam portion 28 may be prepared for receiving the polymeric laminate 30. Such preparation may include applying an adhesive (not shown) over a laminate internal surface 92 of the polymeric laminate 30 and/or the outer surface 68 of the foam portion 28. Once the adhesive has been adequately applied, then the polymeric laminate 30 may be positioned directly over and against the outer surface 68 of the foam portion 28, as depicted in FIG. 11. As depicted, upon the polymeric laminate 30 being adhered to the foam portion 28, the polymeric laminate 30 may extend distally further than the distal end 76 of the foam portion 28 such that the polymeric laminate 30 extends beyond the foam portion 28 to define a hood portion 94 of the polymeric laminate 30. The hood portion 94 of the polymeric laminate may extend partially over some of the anchor frame 24 such that the hood portion 94 may extend over hinges 96 that facilitate pivoting between the anchor frame 24 and the occluder frame 22.

Now with reference to FIGS. 12 and 13A-13C, one embodiment of a process for forming the polymeric laminate 30 (FIG. 4) is provided. Such process may be implemented with a mold 98 and a polymer film stack 100. The mold 98 may define an axis 125 and may be sized and configured to hold the polymer film stack 100 therein. The mold 98 may include upper and lower mold portions 102, 104, the upper mold portion 102 removable relative to the lower mold portion 104 so as to facilitate positioning the polymer film stack 100 within the mold 98. The lower mold portion 102 may extend with a lower peripheral portion 106, but such lower peripheral portion 106 may not be depicted in the schematic views of 13A-13C. The upper mold portion 102 may include multiple portions, such as a first piece 108 and a second piece 110. The first piece 108 may be independently moveable relative to the second piece 110 and along the axis 125. Likewise, the second piece 110 may be independently moveable relative to the first piece 108 and along the axis 125. In one embodiment, the first piece 108 may extend with a cylindrical shape or a disc shape and may be positioned within a space defined in the second piece 110 such that the first piece 108 may be axially aligned relative to the axis 125. The second piece 110 may also be a cylindrical structure or disc structure with the space defined therein such that the second piece 110 may be axially aligned relative to the axis 125. With this arrangement, the first piece 108 may be centrally positioned relative to the second piece 110 such that the axis 125 extends axially through the first piece 108.

Figure 13A:
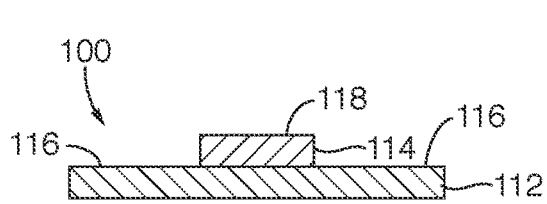
FIG. 13A is a schematic side view of a polymeric film stack, according to another embodiment of the present invention.
Figure 13B:
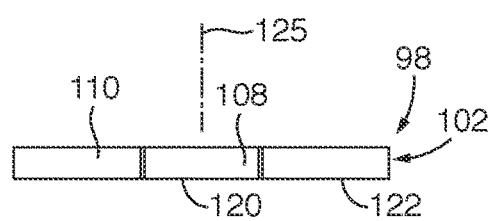
FIG. 13B is a schematic side view of the polymeric film stack positioned between an upper mold and a lower mold, depicting the upper mold have a first and second portions, according to another embodiment of the present invention.
Figure 13B:
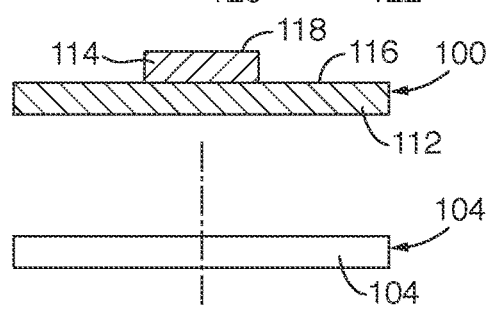
Figure 13C:
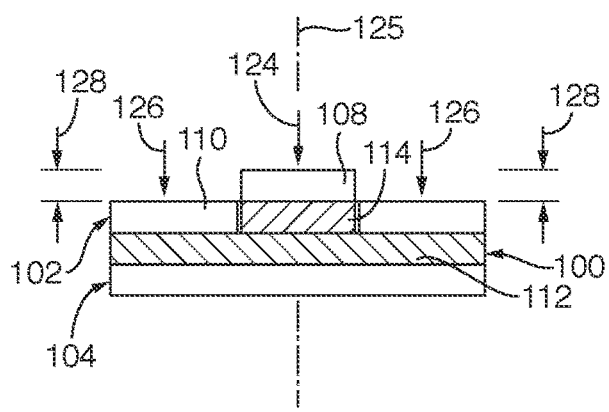
FIG. 13C is a schematic side view of the polymeric film stack engaged by the upper and lower molds, depicting the second portion moveable relative to the first portion upon separate loads being placed thereon, according to another embodiment of the present invention.

In one embodiment, the polymer film stack 100 may include multiple layers, such as a first layer 112 and a second layer 114. The second layer 114 may be stacked on top of, or overly, the first layer 112. Further, although only depicted as single first and second layers 112, 114, each of the first and second layers 112, 114 may include multiple polymer film layers. In another embodiment, one or both of the first and second layers 112, 114 may be single polymer film layers. Further, such polymer film layers are much thinner proportionally relative to the various mold portions, but the proportions depicted in the drawings are schematic and provide a conceptual simplified view. Such polymer film layers may be expanded polytetrafluoroethylene ("ePTFE"). The polymer film stack 100 may define a stepped profile with a first top surface 116 and a second top surface 118, the first top surface 116 corresponding to the first layer 112 and the second top surface 118 corresponding with the second layer 114. As depicted in FIG. 13B, the sizing dimension of the second top surface 118, such as the diameter or length of the second top surface 118, may correspond with the sizing of a first bottom surface 120 of the first piece 108 of the upper mold portion 102. Similarly, the sizing of the first top surface 116 may correspond with the sizing of a second bottom surface 122 of the second piece 110 of the upper mold portion 102. The polymer film stack 100 may be positioned within the mold 98 such that the axis 125 may extend orthogonal or transverse relative to the first and second top surfaces 116, 118 of the respective first and second layers 112, 114 of the polymer film stack 100.

Upon the polymer film stack 100 being positioned within the mold 98, the polymer film stack 100 may be pressed or compressed such that a first load, as shown by arrow 124, may be placed upon the first piece 108 and a second load, a shown by arrows 126, may be placed upon the second piece 110 of the upper mold portion 102. Such first and second loads 124, 126 may be placed upon the mold 98 in a direction extending along or substantially parallel with the axis 125. As such loads are placed upon the first and second pieces 108, 110 of the upper mold portion 102, the second piece 110 is displaced a distance 128 relative to the first piece 108 so that the second bottom surface 122 of the second piece 110 presses against the first top surface 116 of the first layer 112 of the polymer film stack 100 while the first bottom surface 120 of the first piece 108 presses against the second top surface 118 of the second layer 114 of the polymer film stack 100. The distance 128 that the second piece 110 is displaced relative to the first piece 108 may correspond with the stepped height between the first and second layers 112, 114. With this arrangement, the second piece 110 being displaceable or movable relative to the first piece 112 of the upper mold portion 102 facilitates providing pressure against both the first and second top surfaces 116, 118 defining the stepped profile of the polymer film stack 100. While the first and second loads 124, 126 are being placed against the polymer film stack 100 with the displaceable first and/or second pieces 108, 110, the mold 98 and polymer film stack 100 may be heated to a predetermined temperature over a predetermined period of time to facilitate forming the polymeric laminate 30 (FIG. 4) from the polymer film stack 100.

Figure 14A:
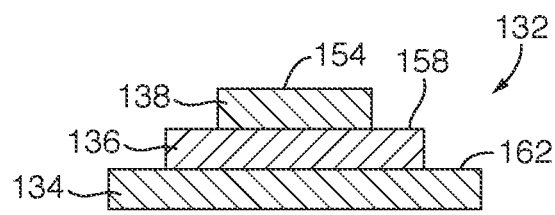
FIG. 14A is a schematic side view of another type of a polymeric film stack, according to another embodiment of the present invention.
Figure 14B:
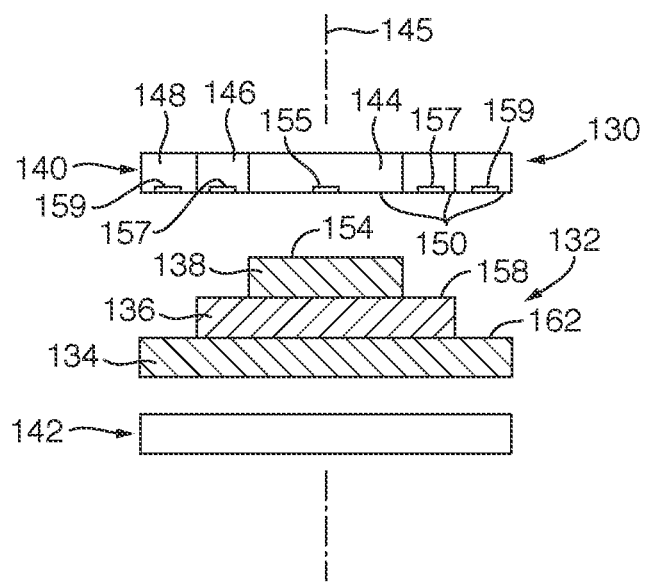
FIG. 14B is a schematic side view of the polymeric film stack positioned between an upper mold and a lower mold, depicting the upper mold have a first portion, a second portion and a third portion, according to another embodiment of the present invention.
Figure 14C:
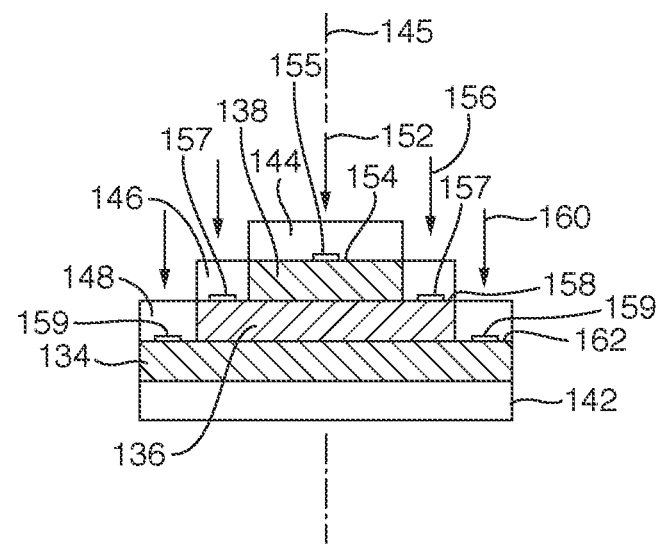
FIG. 14C is a schematic side view of the polymeric film stack engaged by the upper and lower molds, depicting the second and third portions moveable relative to the first portion upon separate loads being placed thereon, according to another embodiment of the present invention.

Now with reference to FIGS. 14A-14C, another embodiment of a mold 130 for forming the polymeric laminate 30 (FIG. 4) is provided. In this embodiment, a polymer film stack 132 extends to define a stepped profile with a first layer 134, a second layer 136 and a third layer 138. Similar to the previous embodiment, each of the first, second and third layers 134, 136, 138 may define multiple polymer film layers therein. The polymer film stack 132 may be sized and configured to be positioned between and within the mold 130. The mold 130 may define an axis 145 and include an upper mold portion 140 and a lower mold portion 142, the axis 145 extending axially through the mold 130. The polymer film stack 132 may be positioned over the lower mold portion 142. Similar to the previous embodiment, the upper mold portion 140 may be moveable relative to the polymer film stack 132 and the lower mold portion 142 such that the upper mold portion 140 may be moveable along the axis 145. For example, the upper mold portion 140 may extend to define a first mold piece 144, a second mold piece 146 and a third mold piece 148. Each of the first, second and third mold pieces 144, 146, 148 may be independently moveable in a direction parallel with the axis 145 and engageable to provide a pressing force or pressure against top surfaces of the polymer film stack 132. Similar to the previous embodiment, the first mold piece 144 may be a cylindrical structure and the second and third mold pieces 146, 148 may be a cylindrical sleeve type structure. Further, each of the first, second, and third mold pieces 144, 146, 148 may extend to define a bottom surface 150 sized and configured to engage the top surfaces of the polymer stack 132. In one embodiment, the first mold piece 144 may extend with the bottom surface 150 to be placed under a first load, as shown by arrow 152, to engage a third layer top 154 surface of the polymer film stack 132. Similarly, the second mold piece 146 may extend with the bottom surface 150 to be placed under a second load, as shown by arrow 156, to engage a second layer top surface 158 of the polymer film stack 132. The third mold piece 148 may extend to the bottom surface 150 to be placed under a third load, as shown by arrow 160, to engage a first layer top surface 162 of the polymer film stack 132. Each of the first, second and third loads 152, 156, 160 may be independent of each other so as to independently and separately move the respective mold pieces to engage the polymer film stack 132 such that the mold pieces are displaceable as needed to engage the corresponding top surface in the polymer film stack 132. Further, such loads may be placed upon the upper mold portion 140 in a direction parallel to the axis 145 defined in the mold 130. Such loading of the first, second and third loads 152, 156, 160 may be employed with pneumatic or hydraulic actuation, as known to one of ordinary skill in the art. Upon providing the appropriate loads for providing pressure to the polymer film stack 132 and upon the polymer film stack 132 being appropriately heated, the polymer film stack 132 may be formed into the polymeric laminate 30 (FIG. 4) and removed from the mold 130. In this manner, the multi-piece mold may be configured to provide loads to the different portions of the polymer film stack and may provide better control of the pressure applied to a polymer film stack 132 to form a more structurally sound polymeric laminate.

In another embodiment, in the event there are irregularities in the thicknesses in the different layers of the polymer film stack 132, it is contemplated that the different mold pieces, such as the first, second, and third mold pieces 144, 146, 148, may include respective first, second and third sensors 155, 157, 159 positioned therein. Such sensors may be configured to sense the variations in thicknesses of the layers and/or pressure placed upon the different layers of the polymer film stack 132 and be associated with a controller to control the loads placed upon the different layers in the polymer film stack 132 so that there is consistency in the pressure applied to the various portions of the polymer film stack 132. As previously set forth, the loads may be independently applied to the first, second and third mold pieces 144, 146, 148, or additional mold pieces as the case may be, to control the pressure applied to the different layers and to accommodate for any potential irregularities in the polymer film stack 132.

Figure 15A:
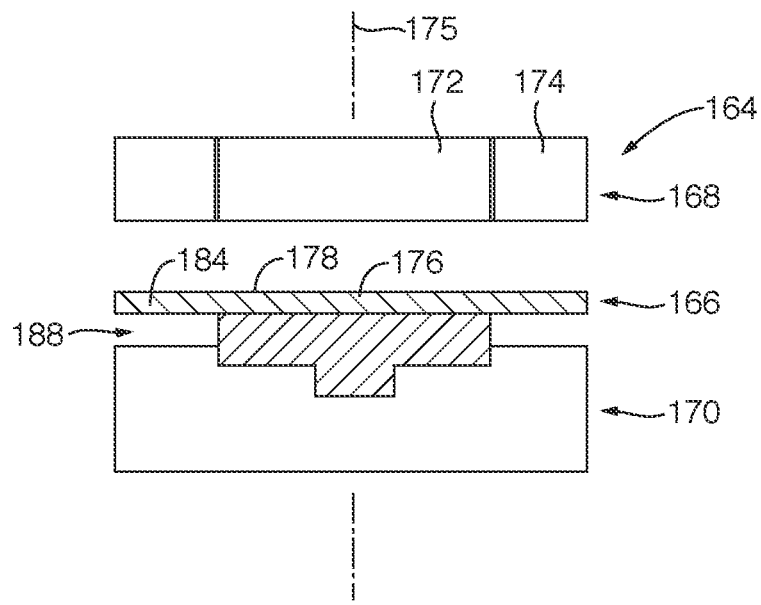
FIG. 15A is a schematic side view of another embodiment of a polymeric film stack positioned between upper and lower molds, depicting the upper mold having a first and second portions, according to the present invention.
Figure 15B:
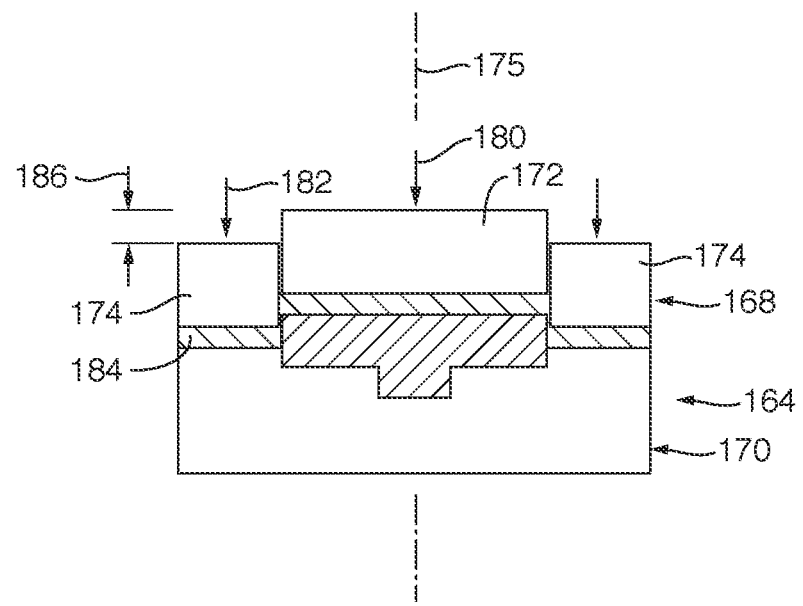
FIG. 15B is a schematic side view of the polymeric film stack engaged by the upper and lower molds, depicting the second portion displacing a portion of the polymeric stack, according to another embodiment of the present invention.

Now with reference to FIGS. 15A and 15B, another embodiment of a mold 164 for forming a polymeric laminate is provided. In this embodiment, a polymer film stack 166 may extend with a stepped profile and multiple layers with a different orientation depicted in the previous embodiments. Further, as in previous embodiments, the mold 164 may define an axis 175 and may include an upper mold portion 168 and a lower mold portion 170. The lower mold portion 170 may extend with a cavity with a stepped mold profile that may at least partially correspond with the stepped profile of the polymer film stack 166. Similar to the previous embodiments, the upper mold portion 168 may include multiple pieces that are independently moveable relative to each other. For example, the upper mold portion 168 may include a first piece 172 and a second piece 174. The first piece 172 may be moveable or receive a first load, as shown by arrow 180, to place a force upon a first portion 176 of a top surface 178 of the polymer film stack 166. The second piece 174 may be moveable or receive a second load, as shown by arrow 182, to place a force upon a second portion 184 of the top surface 178 of the polymer film stack 166 such that the second piece 174 moves downward and is displaced relative to the first piece 172 of the upper mold portion. The second piece 174 may be displaced a distance 186 relative to the first piece 172 to close-off the void 188, depicted in FIG. 15A. Further, as the second piece 174 is displaced the distance 186, a portion of one of the polymer film layers may also become displaced so that there is not a void between the upper and lower mold portions 168, 170. Even further, the first and second loads 180, 182 may be applied to the first and second pieces 172, 174 of the upper mold portion 168 in a direction parallel to the axis 175 of the mold 164 such that the displacement of the second piece 174 may be moveable in the direction parallel to and along the axis 175. In this manner, the polymeric films in the polymeric film stack 166 may be compressed or placed under pressure by the first and second loads 180, 182 so that, upon elevating a temperature of the polymer film stack, the structural characteristics can be more consistent across a diameter or length of the formed polymeric laminate.

Figure 16A:
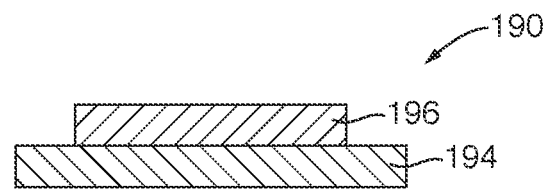
FIG. 16A is a schematic side view of a polymeric film stack, according to the present invention.
Figure 16B:
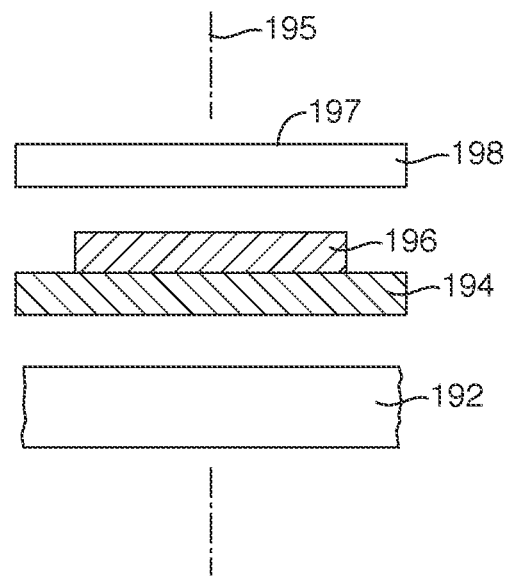
FIG. 16B is a schematic side view of the polymeric film stack positioned between a base plate and a flexible metallic foil, according to another embodiment of the present invention.

Now with reference to FIG. 16A-16C, another embodiment of a process of forming the polymeric laminate 30 (FIG. 4) will now be described. For example, as in previous embodiments, a polymer film stack 190 may be prepared, as depicted in FIG. 16A. Such polymer film stack 190 may be formed and positioned over a rigid plate 192. The polymer film stack 190 may include a first polymer film layer 194 and a second polymer film layer 196. Each of the first and second polymer film layers 194, 196 may include multiple film layers therein. In this embodiment, upon the polymer film stack 190 being prepared over the rigid plate 192, a flexible metallic foil 198 may be positioned over the polymer film stack 190 so as to overly the polymer film stack 190. The rigid plate 192 may define an axis 195 such that the axis 195 may extend through each of the polymer film stack 190 and the metallic foil 198 and such that the layers of the polymer film stack 190 and metallic foil 198 may be oriented so that the axis 195 extends orthogonal relative to upward facing surfaces of the polymer film stack 190 and the metallic foil 198. At this juncture, the polymer film stack 190 positioned between the rigid plate 192 and the metallic foil 198 may be positioned in an enclosed space to be placed under an isostatic pressing process or gas pressure, as shown by arrows 200. The effect of the isostatic pressing or isostatic load 200 applied to a top surface 197 of the metallic foil 198 may be similar to the applied force of previous embodiments, except the isostatic load 200 effectively has an infinite number of load points applied to the top surface 197 to press the layers of the polymer film stack 190. After or during the isostatic pressing or gas pressure process, the polymer film stack 190 may be heated to form the polymeric laminate, as further discussed and described herein.

Figure 17A:
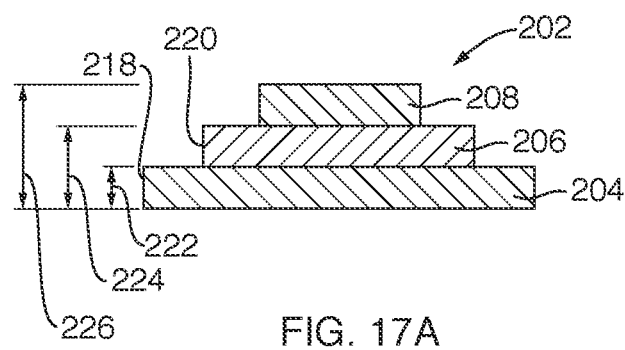
FIG. 17A is a schematic side view of another embodiment of a polymeric film stack, according to the present invention.
Figure 17B:
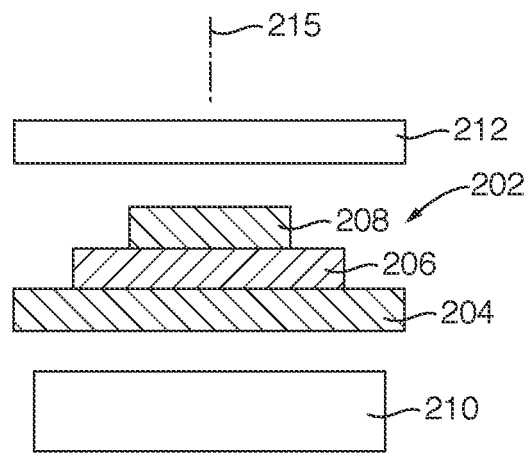
FIG. 17B is a schematic side view of the polymeric film stack positioned between a base plate and a flexible metallic foil, according to another embodiment of the present invention.
Figure 17C:
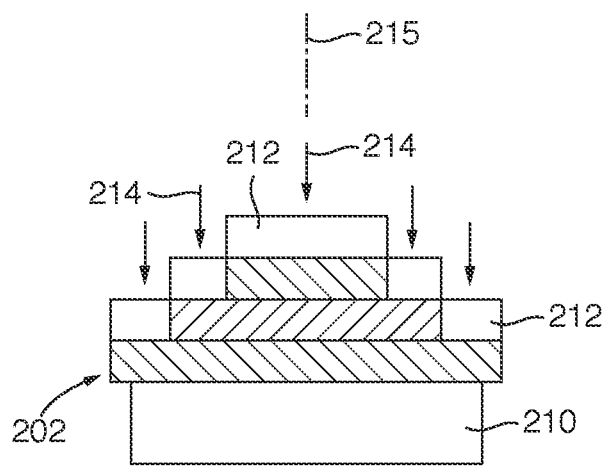
FIG. 17C is a schematic side view of the polymeric film stack engaged with the base plate and the flexible foil, depicting the polymeric stack under a pressurized gas load, according to another embodiment of the present invention.
Figure 18:
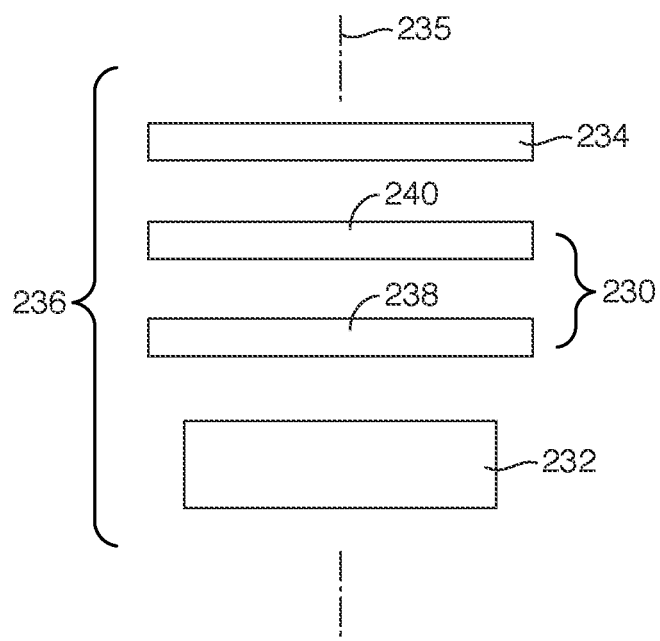
FIG. 18 is a schematic exploded side view of another embodiment of a stack assembly, depicting multiple polymeric films for forming a polymeric laminate, according to another embodiment of the present invention.

With reference to FIGS. 17A-17C, another embodiment of a process of forming the polymeric laminate 30 (FIG. 4) is provided. This embodiment is substantially similar to the previous embodiment, except in this embodiment, the process may employ a polymeric film stack 202 with at least three polymeric film layers. The polymer film stack may include a first layer 204, a second layer 206, and a third layer 208. Each of the first, second and third layers 204, 206, 208 may include multiple layers. The polymer film stack 202 may be positioned to overly a rigid plate 210 with a metallic foil 212 overlying the polymer film stack 202. Further, the rigid plate 210 may define an axis 215 such that the axis 215 may extend orthogonal relative to upward facing surfaces of the polymer film stack 202 and the metallic foil 212. As in the previous embodiment, upon the polymer film stack 202 being positioned between the rigid plate 210 and the metallic foil 212, the components may be positioned within an enclosed space to be placed under isostatic loading or gas pressure, as shown by arrows 214, and may undergo heating of the polymer film stack 202 to thermally bond each of the layers together to form the polymeric laminate, as further discussed herein.

Further, in one embodiment, the polymer film stack 202 may collectively extend with various thicknesses along a length 216 or diameter of the polymer film stack 202. For example, as depicted in FIG. 17A, the various thicknesses of the polymer film stack 202 may be formed due to one edge 218 of one of the polymer film layers being offset relative to another edge 220 of another one of the polymer film layers so as to exhibit a stepped profile. With such stepped profile, the various thicknesses may include a first thickness 222, a second thickness 224, and/or a third thickness 226, or more. With the polymer film stack 202 having the stepped profile, the third thickness 226 exhibited in the polymer film stack may be larger than the first and second thicknesses 222, 224 such that the third layer 208 may be centrally located in the polymer film stack 202. Further, the second thickness 224 may be larger than the first thickness 222. In this manner, the profile of the polymer film stack 202 may be stepped along portions thereof so as to exhibit various thicknesses along the length 216 or diameter of the polymer film stack 202. Further, in another embodiment, the metallic foil 212 may overly the polymer film stack and, upon receiving the isostatic loading 214, as depicted in FIG. 17C, the metallic foil 212 may generally conform to follow the profile of the polymer film stack 202 due to the flexible characteristics of the metallic foil 212.

With reference to FIGS. 18-24, further description for forming the polymeric laminate 30 (FIG. 4) is provided. Note that the components depicted in FIGS. 18-24 are not proportional to actual sizes of such components since the figures are depicting conceptual schematic views. With respect to FIGS. 18 and 19, as in previous embodiments, a polymeric film stack 230 may be positioned between a rigid plate 232 and a flexible metallic foil 234. This arrangement of components may be referenced as a stack assembly 236. The stack assembly 236 may define an axis 235 such that the axis 235 may extend centrally through the components in the stack assembly 236. The polymer film stack 230 may include multiple layers of polymer film, such as a first layer 238 and a second layer 240. Further, the polymer film stack 230 may be prepared to a specified shape and stacked over each other to exhibit various thicknesses in the polymer film stack 230, such as that shown in FIGS. 16A and 17A. In this manner, the polymeric film stack 230 may exhibit various complex geometries or complex side profiles, prepared and positioned between the rigid plate 232 and the flexible metallic foil 234. Further, each of the first and second layers 238, 240 of the polymer film stack 230 may extend as sheet structures that may each define a plane, the sheet structures oriented in the polymer film stack 230 and in the stack assembly 236 so that the axis 235 extends orthogonal or substantially orthogonal relative to the plane defined by the sheet structures of the layers of the polymer film stack 230. The metallic foil 234 may be a thin flexible metallic material sized and configured to be readily removable from the polymeric film stack 230 such that the metallic material 234 does not adhere to the polymeric film stack 230. Further, the metallic foil 234 may extend as a sheet structure and may be oriented in the stack assembly 236 in a similar orientation as the layers of the polymer film stack 230.

In one embodiment, the polymer films of the polymer film stack may extend to define a thickness of, for example, about 35 microns. The metallic foil 234 may also extend with a thickness of, for example, about 35 microns. The rigid plate may include a thickness of about 1/16 inch to about 1/8 inch and may extend with a circular upper surface with a diameter of about 1-2 inches or larger. The metallic foil may be sized to cover appropriate portions of the polymer film stack 230 and the polymer films may extend with predetermined sizes and orientations relative to each other to form the predetermined polymer film stack 230. Further, the metallic foil may be any suitable metallic material, such as stainless-steel or aluminum. The rigid plate may be formed of a metallic material, such as stainless steel, or any other suitable metallic material.

Figure 19:
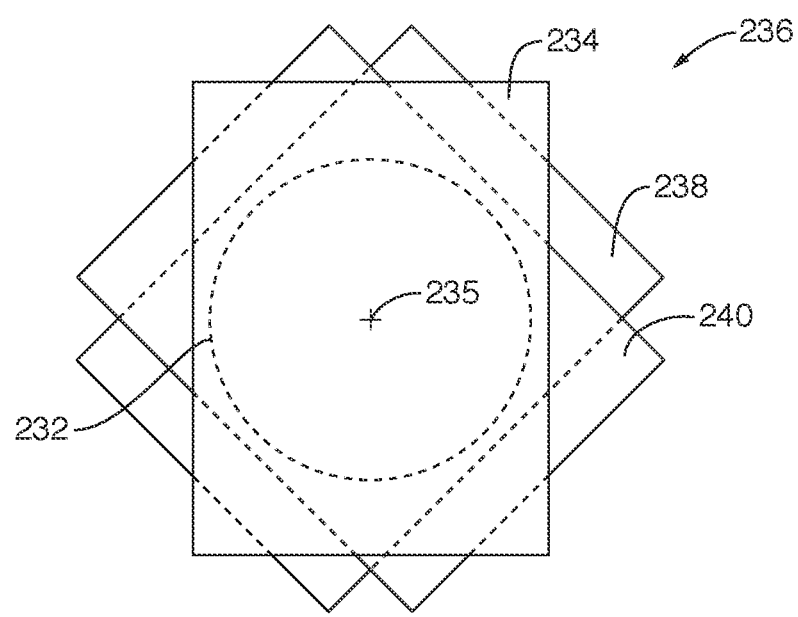
FIG. 19 is a schematic top view of the stack assembly, depicting the adjacent polymeric films oriented transverse relative to each other, according to another embodiment of the present invention.

With reference to FIG. 19, as depicted from a top view of the stack assembly 236, an orientation of the first and second layers 238, 240 of polymer film may be transverse relative to adjacently positioned polymer film. Such transverse relationship may be based or relative to the direction of the greatest tension strength of each polymer film. As previously set forth, the polymer film may be an ePTFE material. As known by one of ordinary skill in the art, the tension strength of a given ePTFE film is strongest in one direction and any direction transverse to that one direction, the tension strength may be less than in that one direction. As such, the polymer film stack 230 may be prepared so that adjacently overlapping or underlying polymeric film may be oriented transverse to each other relative to their greatest direction of tensile strength. In this manner, the collective strength characteristics of the polymeric film stack 230 may be enhanced based on the predetermined positioning and orientation of the various layers of the polymer film stack 230.

Figure 20:
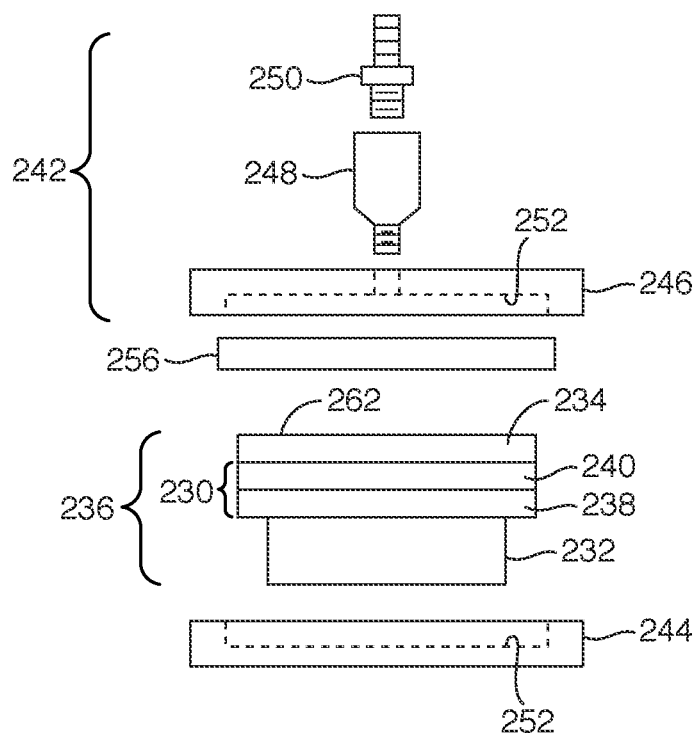
FIG. 20 is an exploded schematic view of the stack assembly associated with a pressurization assembly, according to another embodiment of the present invention.
Figure 21:
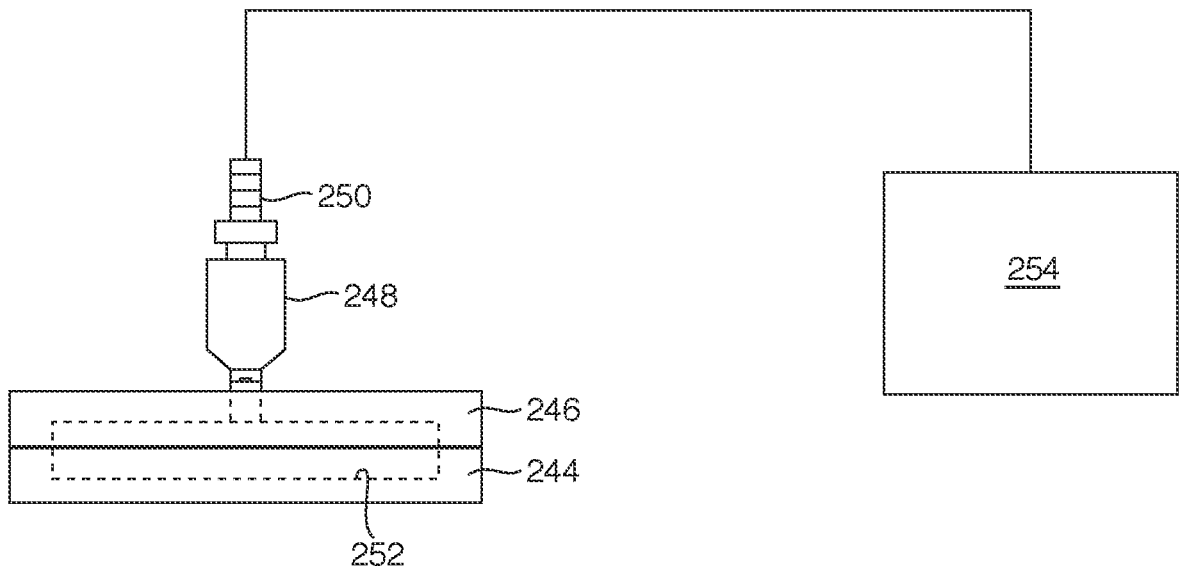
FIG. 21 is a schematic view of the pressurization assembly coupled to a gas pressurization source, according to another embodiment of the present invention.

With reference to FIGS. 20 and 21, upon the stack assembly 236 being prepared, the stack assembly 236 may be assembled with various fixture components 242. For example, the fixture components 242 may include a lower plate 244, an upper plate 246, a fixture valve 248, and a hose adapter 250. The lower plate 244 and the upper plate 246 may be sized and configured to seal the stack assembly 236 therebetween. The lower plate 244 and/or the upper plate 246 may include a cavity 252, shown in outline form, sized and configured to hold the stack assembly 236 therein. The stack assembly 236 in a prepared state for positioning within the cavity 252 may include the polymer film stack 230 positioned between and directly engaging the rigid plate 232 and the metallic foil 234. The fixture valve 248 and the hose adapter 250 may be sized and configured to couple to the upper plate 246 to deliver pressurized gas from a gas pressurization system 254 to the cavity 252 between the lower and upper plates 244, 246. The lower and upper plates 244, 246 may also include an O-ring 256 to act as a seal upon the lower and upper plates 244, 246 being coupled together. Such coupling of the lower and upper plates 244, 246 may be implemented with clamps (not shown) or the like. Further, the pressurization system 254 may be sized and configured to pressurize the space defined by the cavity 252 up to about 2.5 PSI. Further, the fixture components, such as the fixture valve 248, lower and upper plates 244, 246 and the O-ring 256 may exhibit structural characteristics that can withstand high temperatures.

Figure 16C:
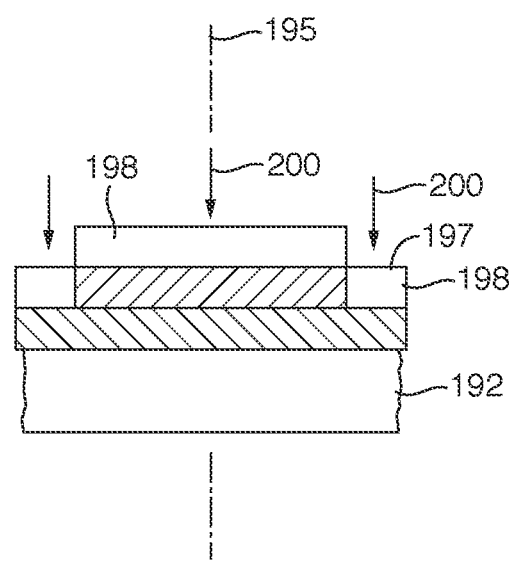
FIG. 16C is a schematic side view of the polymeric film stack engaged with the base plate and the flexible foil, depicting the polymeric stack under a pressurized gas load, according to another embodiment of the present invention.

Now with reference to FIGS. 20, 21 and 22, upon the stack assembly 236 being enclosed and sealed within the lower and upper plates 244, 246, the stack assembly 236 between the lower and upper plates 244, 246 may undergo an isostatic pressing process or isostatic pressure, similar to that depicted and described relative to FIGS. 16C and 17C. For example, the cavity 252 defined between the lower and upper plates 244, 246 may be pressurized with the gas pressurization system 254 to a predetermined pressure, such as to about 1.25 PSI. Upon pressurizing the space in the cavity 252, the stack assembly 236 is then under isostatic pressure. The pressurization system 254 may then be disconnected from the fixture valve 248 such that the cavity 252 defined between the lower and upper plates 244, 246 maintains its pressurized state. The stack assembly 236, pressurized between the lower and upper plates 244, 246, may then be positioned within a furnace 258. As the temperature increases, the pressure within the cavity 252 defined between the lower and upper plates 244, 246 may also increase. For example, prior to being placed within the furnace 258, the initial temperature of the stacked assembly 236 may be about room temperature (about 297 Kelvin). As the pressurized assembly undergoes an elevated temperature in the furnace 258 (up to about 600 Kelvin), the isostatic pressure applied to the stacked assembly 236 in the cavity 252 between the lower and upper plates 244, 246 may increase to about 2.5 PSI. Due to the pressure being applied via pressurization of gas to the stack assembly 236, see e.g., FIGS. 16C and 17C, the isostatic pressure applied to the top surface is equal along all portions of the top surface 262. Further, such pressure being applied in combination to elevating the temperature in the furnace 258, the polymeric film in the polymer film stack 230 may become thermally bonded together in a structurally consistent manner due to the consistency of the pressure applied across the top surface to, thereby, form a polymeric laminate.

With respect to FIGS. 22, 23 and 24, upon the stack assembly 236 being heated to a predetermined temperature for a predetermined period of time, the polymer film stack 230 (FIG. 20) within the assembly may be formed into a polymeric laminate 260. The stack assembly 236 may then be removed from the furnace 258 and left to cool for a predetermined period of time. Such cooling time allows the polymeric laminate 260 to appropriately cure. Once the stack assembly 236 has sufficiently cooled, the cavity 252 holding the stack assembly 236 may be depressurized. The assembly may then be disassembled so as to be removed from the lower and upper plates 244, 246. The flexible metallic foil 234 may then be removed from the polymeric laminate 260. The polymeric laminate 260 may also be removed from the rigid plate 232. At this juncture, the polymeric laminate 260 may then be prepared for further processing to be formed into the cup like shape, as depicted in FIG. 4, or any other needed or appropriate shape. With this arrangement, due to the consistency of the isostatic pressure applied across the top surface 262 (FIG. 20) of the stack assembly 236, the physical characteristics of the laminate may be consistent across the diameter or length of the polymeric laminate 260.

While the invention may be susceptible to various modifications and alternative forms, specific embodiments have been shown by way of example in the drawings and have been described in detail herein. However, it should be understood that the invention is not intended to be limited to the particular forms disclosed. Rather, the invention includes incorporating any portion of one embodiment with another embodiment, all modifications, equivalents, and alternatives falling within the spirit and scope of the invention as defined by the following appended claims.

What is claimed is:

1. A medical device for occluding a left atrial appendage of a heart, comprising:
    a framework including occluder frame segments coupled to a hub defining an axis, the occluder frame segments of the framework extending radially outward and distally relative to the axis from the hub to a distal end such that the occluder frame segments extend to define an internal surface and an external surface of the occluder frame segments; and
    an occluder member including:
        a foam portion of the occluder member extending entirely with a single piece, seamless monolithic structure having a cup-like shape defining an internal side foam surface and an external side foam surface extending between a proximal foam end and a distal foam end, the foam portion sized and configured to correspond with the external surface of the occluder frame segments of the framework, the internal side foam surface of the foam portion being positionable against the external surface of the occluder frame segments of the framework such that the proximal foam end is positionable adjacent the hub and the distal foam end is positionable adjacent the distal end of the occluder frame segments; and
        a polymeric laminate directly attached to the external side foam surface of the foam portion between the proximal foam end and the distal foam end, the polymeric laminate having an outer surface extending to define a stepped profile, the stepped profile including at least a first outer surface, a second outer surface, and a third outer surface;
    wherein each of the first outer surface, the second outer surface and the third outer surface corresponds with a respective first layer, a second layer, and a third layer.

2. The medical device of claim 1, wherein the foam portion extends to define an opening therein such that the proximal foam end defines the opening of the foam portion.

3. The medical device of claim 1, wherein the foam portion extends with a substantially consistent thickness.

4. The medical device of claim 1, wherein the foam portion is configured to be stitched to portions of the framework.

5. The medical device of claim 1, wherein the polymeric laminate is adhesively attached to the external side foam surface of the foam portion.

6. The medical device of claim 1, wherein the foam portion comprises a biodegradable material extending with a scaffold structure, the scaffold structure sized and configured to induce tissue in-growth therein.

7. The medical device of claim 1, wherein the single piece, seamless monolithic structure is a molded structure.

8. The medical device of claim 1, wherein the framework comprises anchor frame segments coupled to the occluder frame segments.

9. The medical device of claim 1, wherein the framework comprise tines coupled thereto.

10. The medical device of claim 1, wherein the framework comprises anchor frame segments coupled to the occluder frame segments with hinges such that a hood portion of the polymeric laminate extends over the hinges.

11. The medical device of claim 1, wherein the framework comprises anchor frame segments, the anchor frame segments pivotably coupled to the occluder frame segments such that anchor frame segments include an anchor hub, the anchor hub moveable along the axis defined by the hub.

12. The medical device of claim 1, the polymeric laminate positioned to extend beyond the distal foam end of the foam portion so as to define a hood portion of the polymeric laminate, the hood portion extending over a portion of the framework.

13. The medical device of claim 1, wherein the stepped profile of the polymeric laminate defines at least a first thickness, a second thickness, and a third thickness.

14. A medical device for occluding a left atrial appendage of a heart, comprising:
    a framework including occluder frame segments coupled to a hub defining an axis, the occluder frame segments of the framework extending radially outward and distally relative to the axis from the hub to a distal end such that the occluder frame segments extend to define an internal surface and an external surface of the occluder frame segments; and
    an occluder member including:
        a foam portion of the occluder member extending entirely with a single piece, seamless monolithic structure having a cup-like shape defining an internal side foam surface and an external side foam surface extending between a proximal foam end and a distal foam end, the foam portion sized and configured to correspond with the external surface of the occluder frame segments of the framework, the internal side foam surface of the foam portion being positionable against the external surface of the occluder frame segments of the framework such that the proximal foam end is positionable adjacent the hub and the distal foam end is positionable adjacent the distal end of the occluder frame segments; and
        a polymeric laminate directly attached to the external side foam surface of the foam portion between the proximal foam end and the distal foam end, the polymeric laminate having an outer surface extending to define a stepped profile, the stepped profile including at least a first outer surface, a second outer surface, and a third outer surface;
    wherein the stepped profile of the polymeric laminate defines at least a first thickness, a second thickness, and a third thickness.

15. The medical device of claim 14, wherein the foam portion extends to define an opening therein such that the proximal foam end defines the opening of the foam portion.

16. The medical device of claim 14, wherein the foam portion extends with a substantially consistent thickness.

17. The medical device of claim 14, wherein the polymeric laminate is adhesively attached to the external side foam surface of the foam portion.

18. The medical device of claim 14, wherein the foam portion comprises a biodegradable material extending with a scaffold structure, the scaffold structure sized and configured to induce tissue in-growth therein.

19. The medical device of claim 14, wherein the single piece, seamless monolithic structure is a molded structure.

20. The medical device of claim 14, wherein each of the first outer surface, the second outer surface and the third outer surface corresponds with a respective first layer, a second layer and a third layer.

* * * * *